United States Patent
Mikawa et al.

(10) Patent No.: US 11,240,405 B2
(45) Date of Patent: Feb. 1, 2022

(54) IMAGE CAPTURING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventors: Atsushi Mikawa, Tokyo (JP); Kazuya Kitamura, Kawasaki (JP); Tomoya Yamashita, Yokohama (JP); Takamichi Kosugi, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/881,364

(22) Filed: May 22, 2020

(65) Prior Publication Data

US 2020/0382680 A1 Dec. 3, 2020

(30) Foreign Application Priority Data

May 27, 2019 (JP) .............................. JP2019-098809

(51) Int. Cl.
*H04N 5/073* (2006.01)
*H04N 5/91* (2006.01)
*H04N 5/232* (2006.01)

(52) U.S. Cl.
CPC ............. *H04N 5/073* (2013.01); *H04N 5/232* (2013.01); *H04N 5/91* (2013.01)

(58) Field of Classification Search
CPC .......... H04N 5/073; H04N 5/91; H04N 5/232; H04N 5/772; H04N 9/8042; H04N 5/0675;

(Continued)

(56) References Cited

U.S. PATENT DOCUMENTS

2001/0048482 A1* 12/2001 Takemoto ................ G09G 5/14
348/564
2007/0182851 A1* 8/2007 Chon ....................... H04N 5/10
348/525

(Continued)

FOREIGN PATENT DOCUMENTS

JP 2012-253599 A 12/2012

*Primary Examiner* — Michael Lee
(74) *Attorney, Agent, or Firm* — Cowan, Liebowitz & Latman, P.C.

(57) ABSTRACT

An image capturing apparatus comprises an input terminal for synchronization with another image capturing apparatus; a generating unit that generates a video signal using an image capturing unit; a first detecting unit that detects an input of a first synchronization signal; a second detecting unit that detects an input of a second synchronization signal; a first synchronization unit that carries out a first synchronization process for synchronizing the video signal on the basis of the first synchronization signal; a second synchronization unit that carries out a second synchronization process for synchronizing the video signal on the basis of the second synchronization signal; and a control unit that carries out control so that when the first synchronization signal has been detected while the second synchronization process is being executed, the second synchronization process is stopped and the first synchronization process is executed.

22 Claims, 16 Drawing Sheets

(58) Field of Classification Search
CPC .. H04N 5/2251; H04N 5/2253; H04N 5/2254; H04N 5/23216
USPC ........................................................ 348/510
See application file for complete search history.

(56) References Cited

U.S. PATENT DOCUMENTS

2010/0315129 A1* 12/2010 Hashimoto ............ H03K 5/135
 327/99
2017/0104896 A1* 4/2017 Scurrell ................. H04N 21/00
2017/0289528 A1* 10/2017 Shioda ............... A61B 1/00193

* cited by examiner

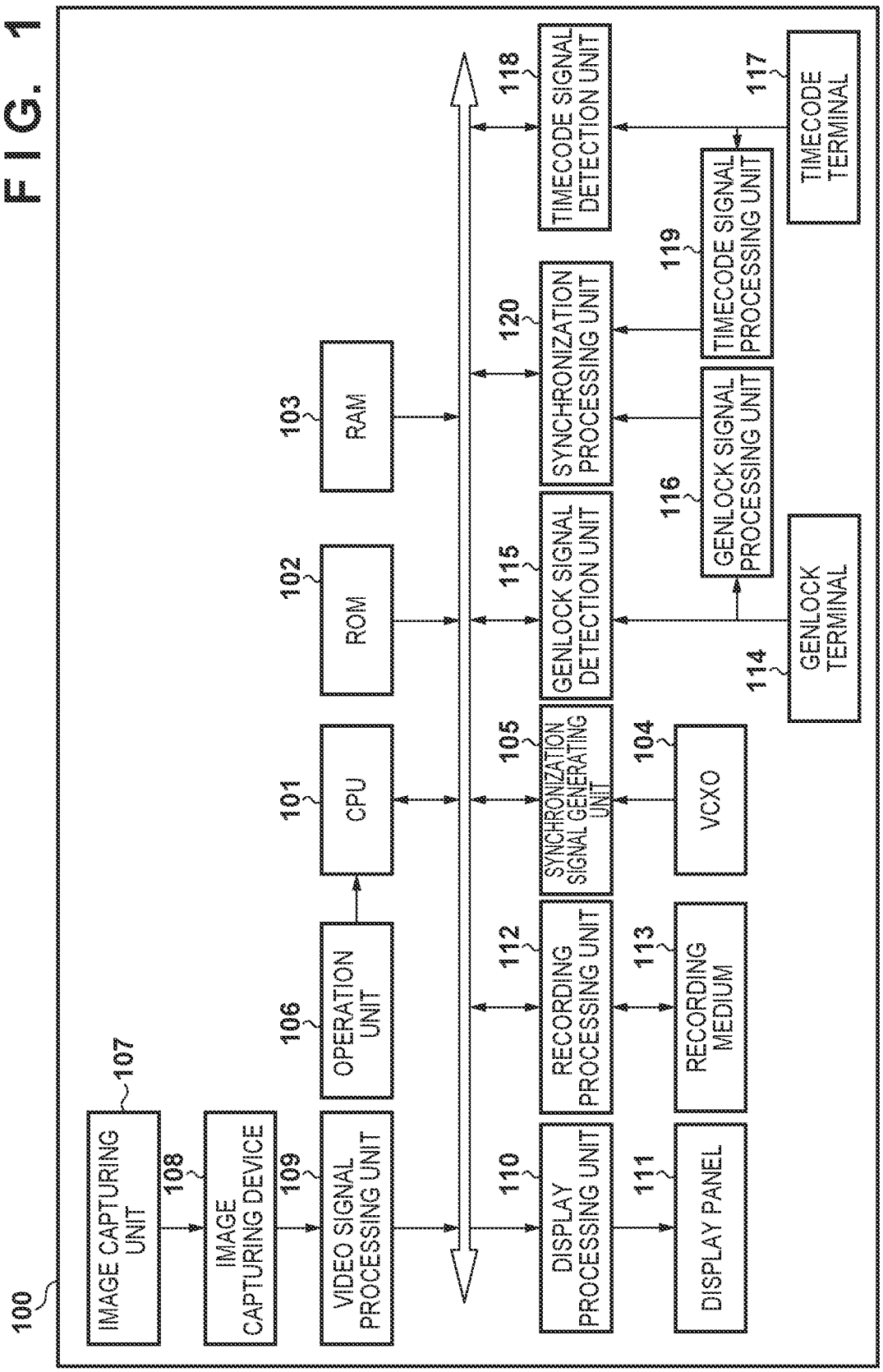

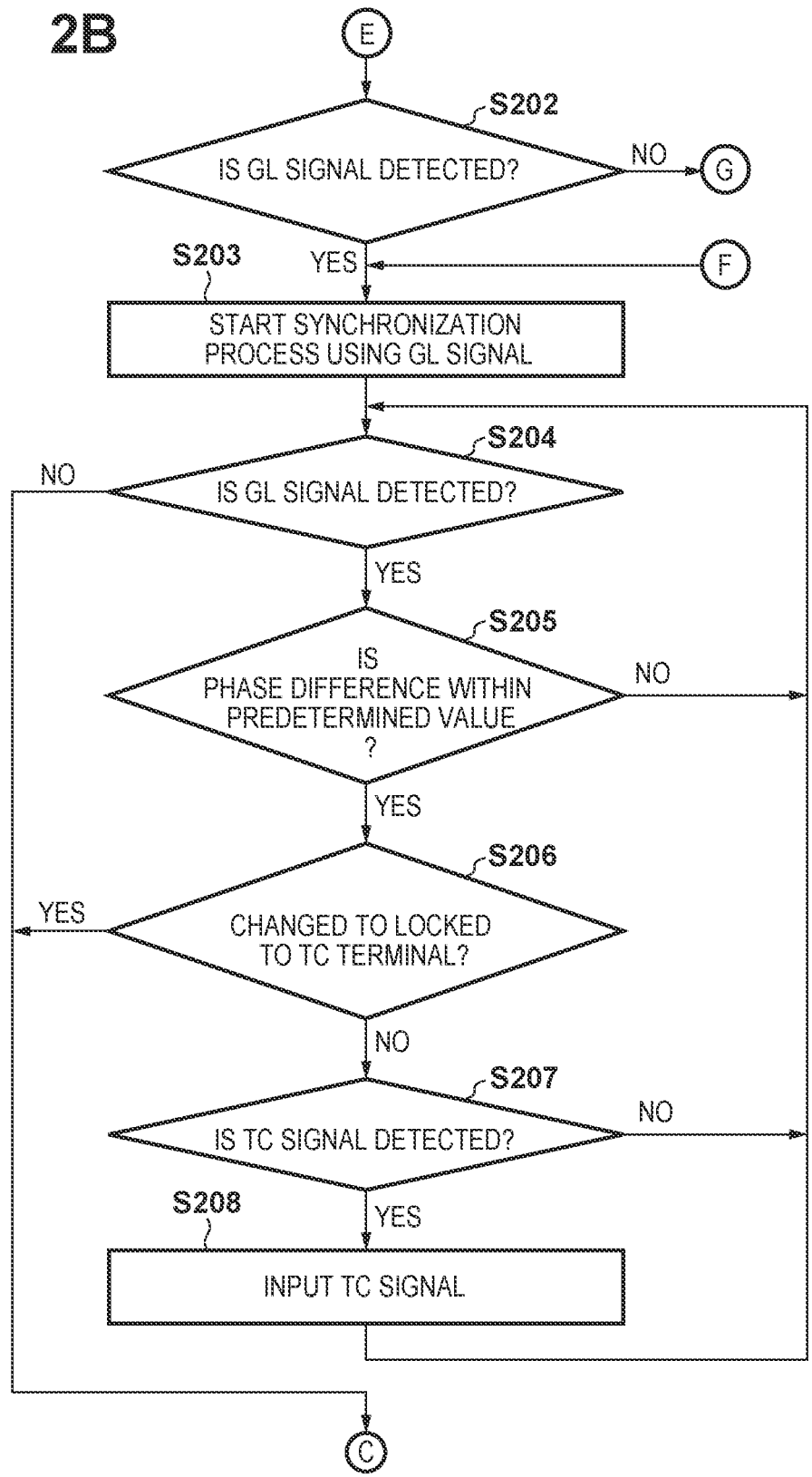

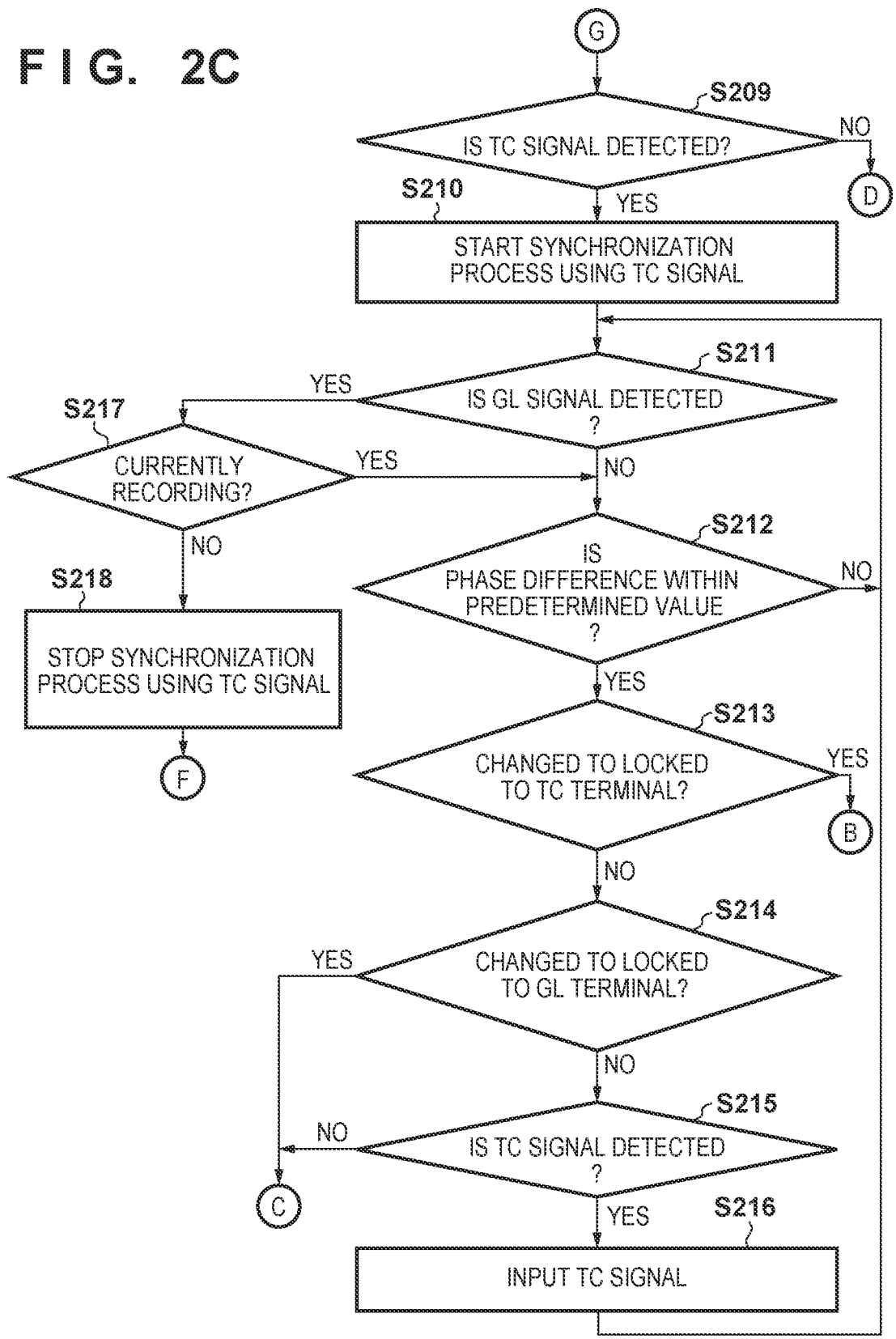

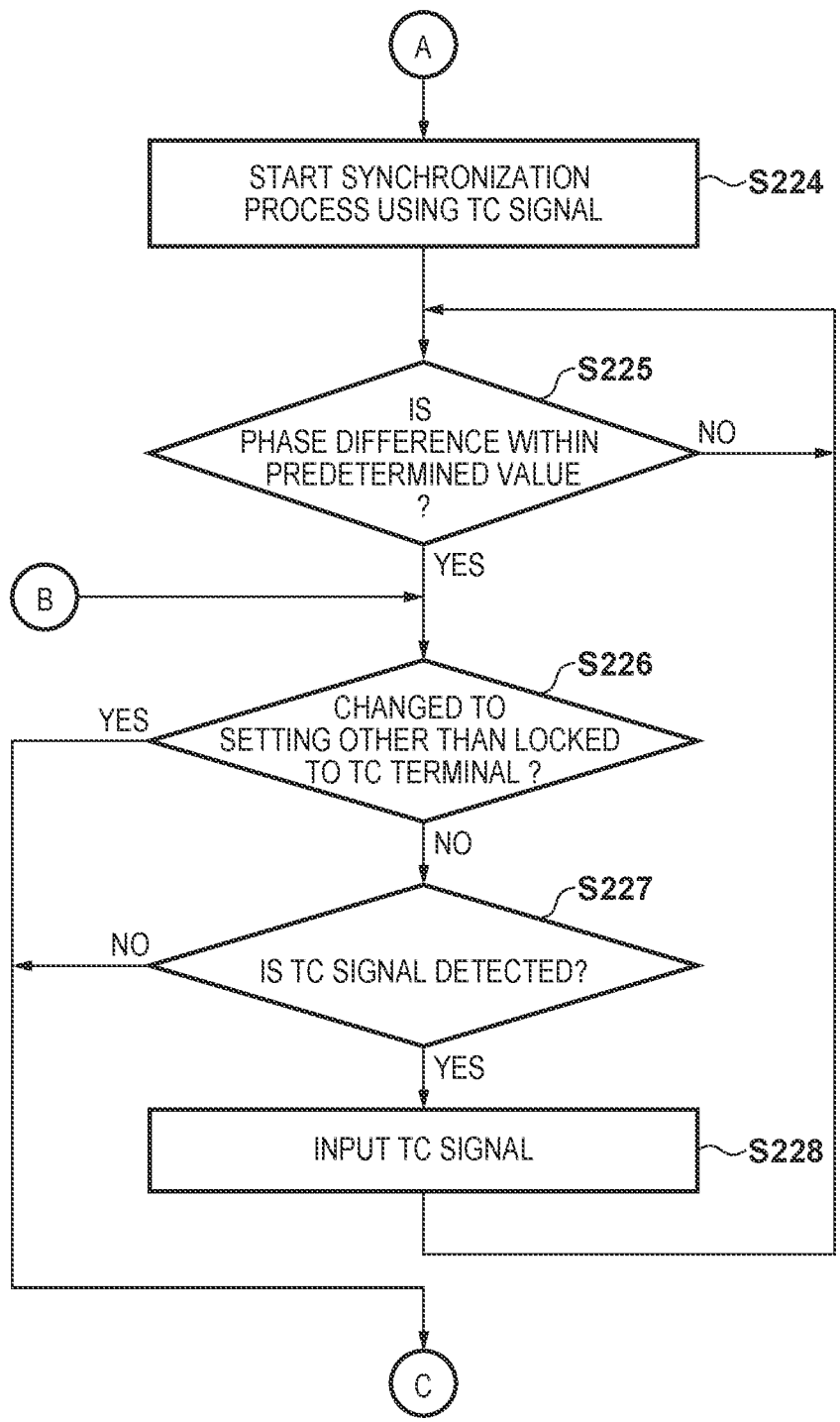

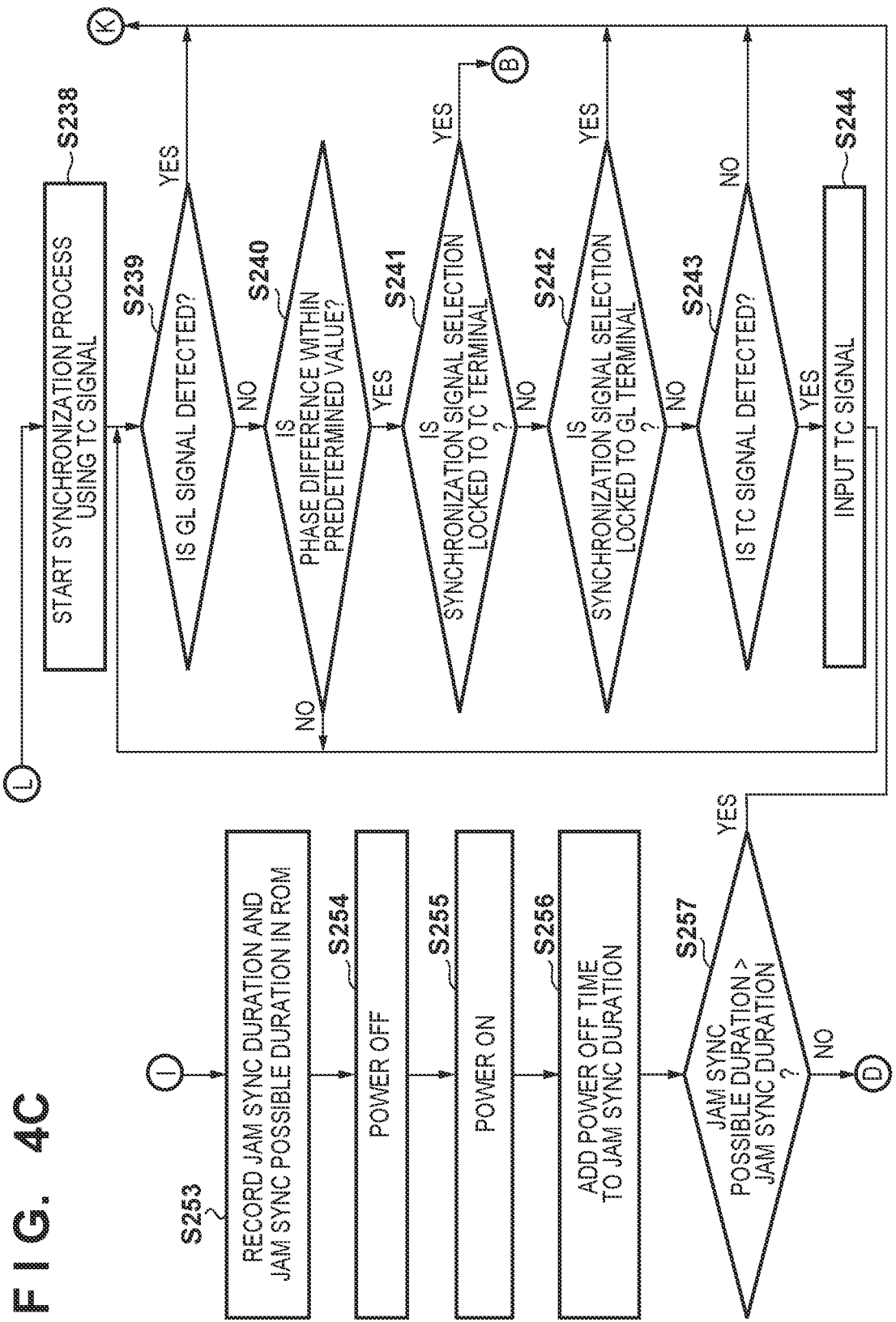

IMAGE CAPTURING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an image capturing apparatus, a control method thereof, and a non-transitory computer-readable storage medium.

Description of the Related Art

When shooting images using multiple video cameras, the video signals from the video cameras are synchronized with timecodes, and the synchronized video is then used for editing. The video signals from video cameras are typically synchronized by inputting dedicated synchronization signals such as tri-level synchronization signals and black and burst signals ("GENLOCK (GL) signals" hereinafter), whereas timecodes are synchronized by inputting timecode signals ("TC signals" hereinafter). It is therefore necessary to connect two cables: one for the GL signal, and one for the TC signal.

However, there are also techniques which enable easier connections during installation by transmitting the GL signal and the TC signal over a single cable (e.g., Japanese Patent Laid-Open No. 2012-253599). Such techniques require special cables, however, and are therefore only usable in limited situations.

Video cameras that synchronize video signals using TC signals have also appeared in recent years. A synchronization process using TC signals makes it possible to carry out both the process for synchronizing the video signals and the process for synchronizing the timecodes using a single cable, which does enable easier connections during installation. While TC signals have been standardized by the Society of Motion Picture and Television Engineers (SMPTE), the provisions with respect to jitter are lax. This results in more phase noise during synchronization than when using GL signals, which can lead to a drop in the precision of phase synchronization (i.e., how closely the phase of the synchronization source can be matched). It is thus conceivable to provide a GL signal input terminal ("GENLOCK terminal" hereinafter) and a TC signal input terminal ("timecode terminal" hereinafter) separately, with a user selecting which signal is to be used for synchronization through a menu or the like.

A video camera provided with both GENLOCK and timecode terminals has a problem in that the desired video signal synchronization may not be able to be achieved depending on the order in which cables are connected to or removed from the terminals, resulting in the user misrecognizing the signal being used for the synchronization.

For example, if a cable is connected to the timecode terminal to carry out timecode synchronization, and a cable is then connected to the GENLOCK terminal for synchronizing the video signals with precision, the video signals will first be synchronized using the TC signals. This means that the video signals will not be synchronized using the GL signals, but the user may continue his or her work without noticing this. Even if he or she notices, it is then necessary to change menu settings or the like in order to prioritize the GL signals, which complicates the operations.

Also, when synchronizing multiple cameras, there are cases where a single GL signal is connected to the cameras one by one in order (i.e., the cable is disconnected after synchronization is complete, and then connected to the next video camera). The TC signal is then connected one by one in order for timecode synchronization. If the GL signal is disconnected after the video signal synchronization is complete, the cameras will operate in Jam Sync mode, which is a substantially synchronized state. However, if the TC signal is then connected in that state, synchronization will be carried out using the TC signal, which may cause a drop in the precision of the synchronization.

SUMMARY OF THE INVENTION

Having been achieved in light of the foregoing problems, the present invention provides a technique that, when a plurality of types of synchronization signals can be input, makes it possible to carry out a video signal synchronization process using a user's desired synchronization signal, without entailing complicated operations.

Some video cameras omit the GENLOCK terminal to achieve a more compact size. With such a video camera, it is conceivable to employ a configuration where an expansion unit provided with a GENLOCK terminal is connected to enable synchronization using a GL signal. However, there is a problem in that if synchronization using the GL signal is selected in a menu despite the expansion unit not being connected, the synchronization process using the TC signal will remain unexecuted. Conversely, there is also a risk that synchronization will be carried out using the TC signal despite the expansion unit being connected and the GL signal being input to the GENLOCK terminal. The present invention also provides a technique for addressing these problems.

According to a first aspect of the invention, there is provided an image capturing apparatus having an input terminal for synchronization with another image capturing apparatus, the apparatus comprising: a generating unit that generates a video signal by shooting an image using an image capturing unit; a first detecting unit that detects an input of a first synchronization signal; a second detecting unit that detects an input of a second synchronization signal; a first synchronization unit that carries out a first synchronization process for synchronizing the video signal on the basis of the first synchronization signal; a second synchronization unit that carries out a second synchronization process for synchronizing the video signal on the basis of the second synchronization signal; and a control unit that carries out control so that when the first synchronization signal has been detected by the first detecting unit while the second synchronization process is being executed, the second synchronization process is stopped and the first synchronization process is executed.

According to a second aspect of the invention, there is provided a method of controlling an image capturing apparatus having an input terminal for synchronization with another image capturing apparatus, the method comprising:
 (a) generating a video signal by shooting an image using an image capturing unit;
 (b) detecting an input of a first synchronization signal;
 (c) detecting an input of a second synchronization signal;
 (d) carrying out a first synchronization process for synchronizing the video signal on the basis of the first synchronization signal;

(e) carrying out a second synchronization process for synchronizing the video signal on the basis of the second synchronization signal; and (f) carrying out control so that when the first synchronization signal has been detected in the detecting (b) while the second synchronization process is being executed, the second synchronization process is stopped and the first synchronization process is executed.

According to a third aspect of the invention, there is provided a non-transitory computer-readable storage medium storing a program which, when read and executed by a computer of an image capturing apparatus having an input terminal for synchronization with another image capturing apparatus, causes the image capturing apparatus to executes the steps of a method of controlling the image capturing apparatus, the method comprising:

(a) generating a video signal by shooting an image using an image capturing unit;

(b) detecting an input of a first synchronization signal;

(c) detecting an input of a second synchronization signal;

(d) carrying out a first synchronization process for synchronizing the video signal on the basis of the first synchronization signal;

(e) carrying out a second synchronization process for synchronizing the video signal on the basis of the second synchronization signal; and (f) carrying out control so that when the first synchronization signal has been detected in the detecting (b) while the second synchronization process is being executed, the second synchronization process is stopped and the first synchronization process is executed.

According to the present invention, a video signal synchronization process can be carried out using a first synchronization signal or a second synchronization signal depending on the circumstances, without entailing complicated operations.

Further features of the present invention will become apparent from the following description of exemplary embodiments (with reference to the attached drawings).

BRIEF DESCRIPTION OF THE DRAWINGS

FIG. 1 is a block diagram illustrating an image capturing apparatus applied in a first embodiment.

FIGS. 2A to 2C are flowcharts illustrating a control sequence executed by the image capturing apparatus according to the first embodiment.

FIG. 3 is a flowchart illustrating a control sequence executed by the image capturing apparatus according to the first embodiment.

FIGS. 4A to 4C are flowcharts illustrating a control sequence executed by the image capturing apparatus according to the first embodiment.

DESCRIPTION OF THE EMBODIMENTS

Figure 2A:
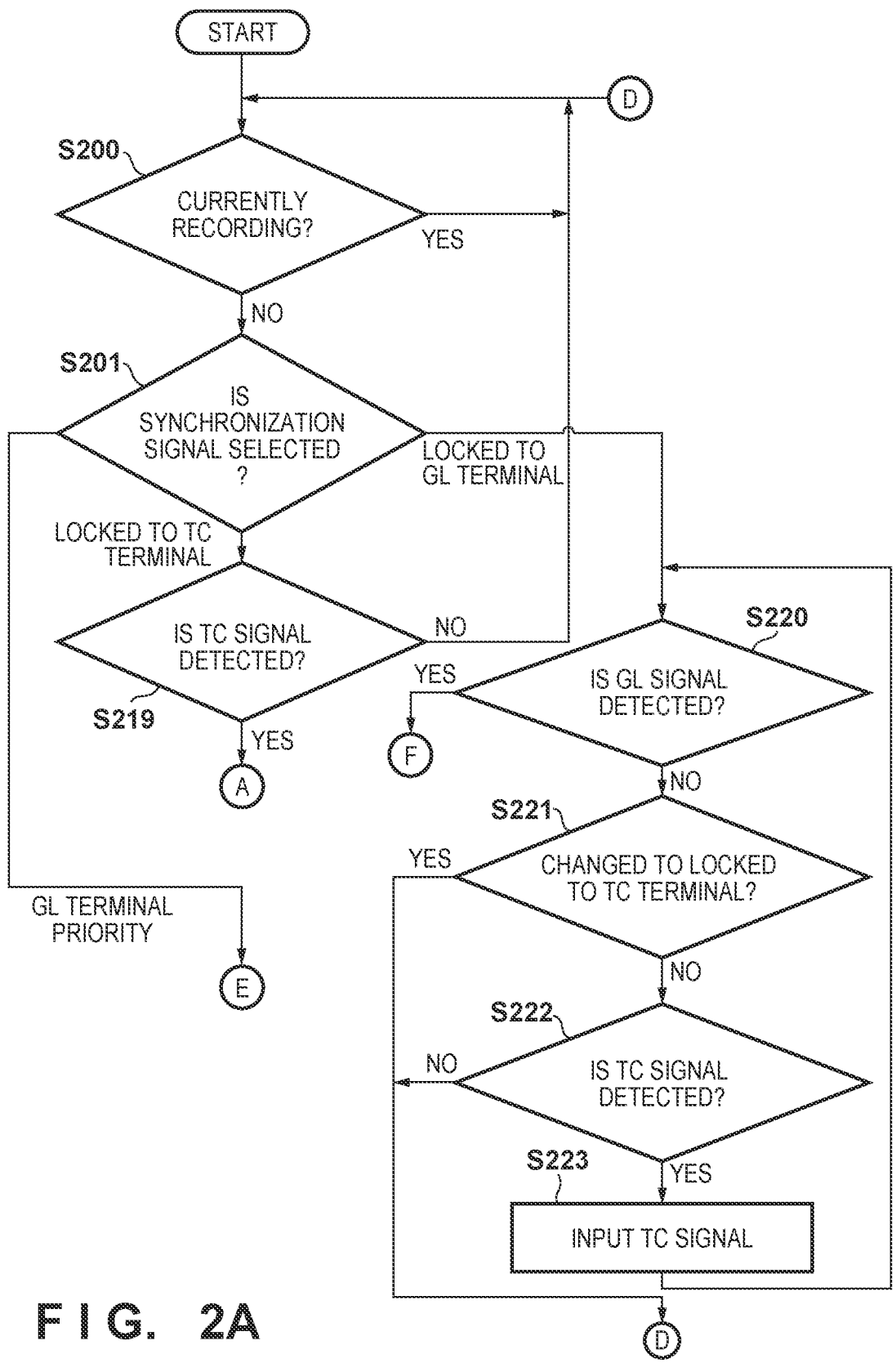
Figure 4A:
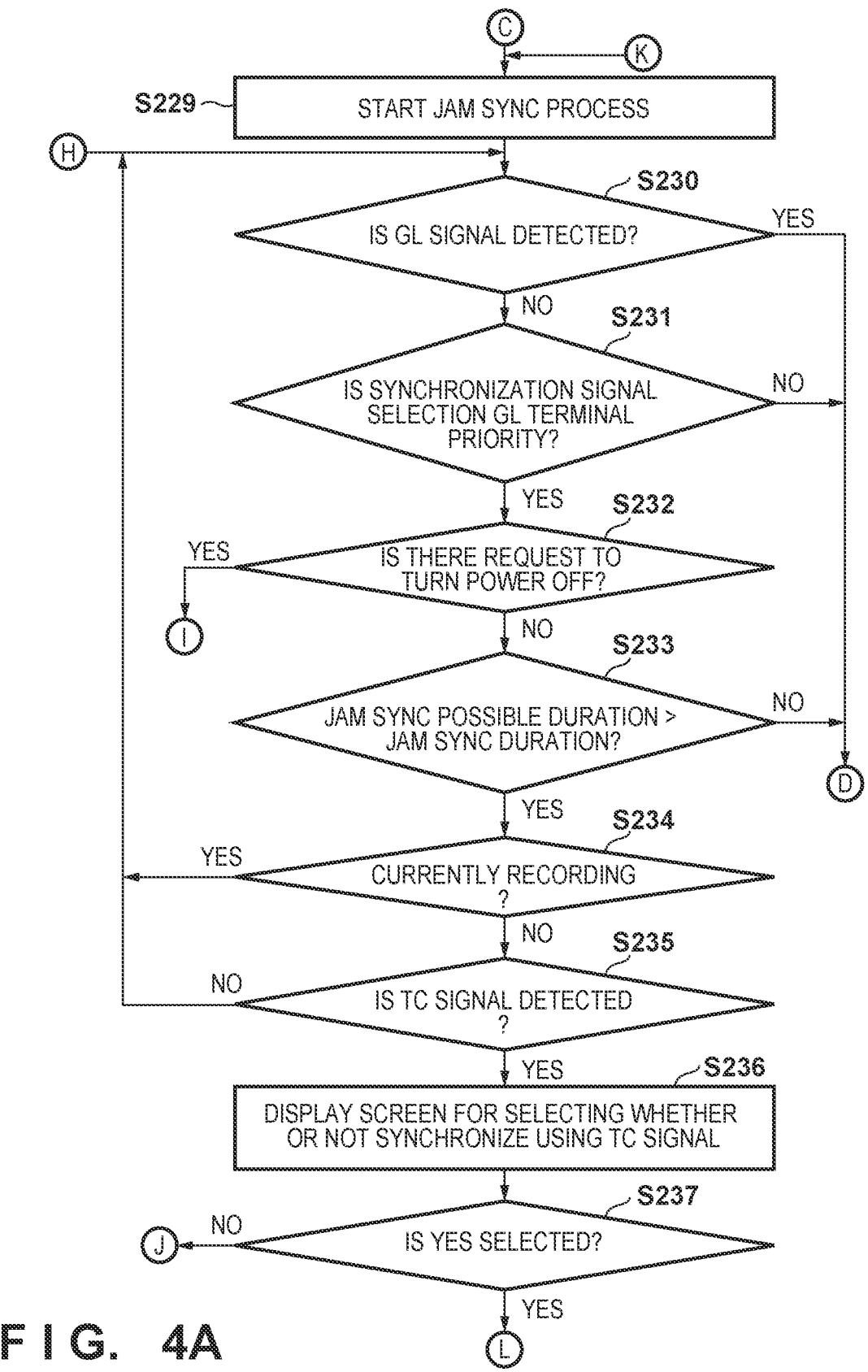
Figure 4B:
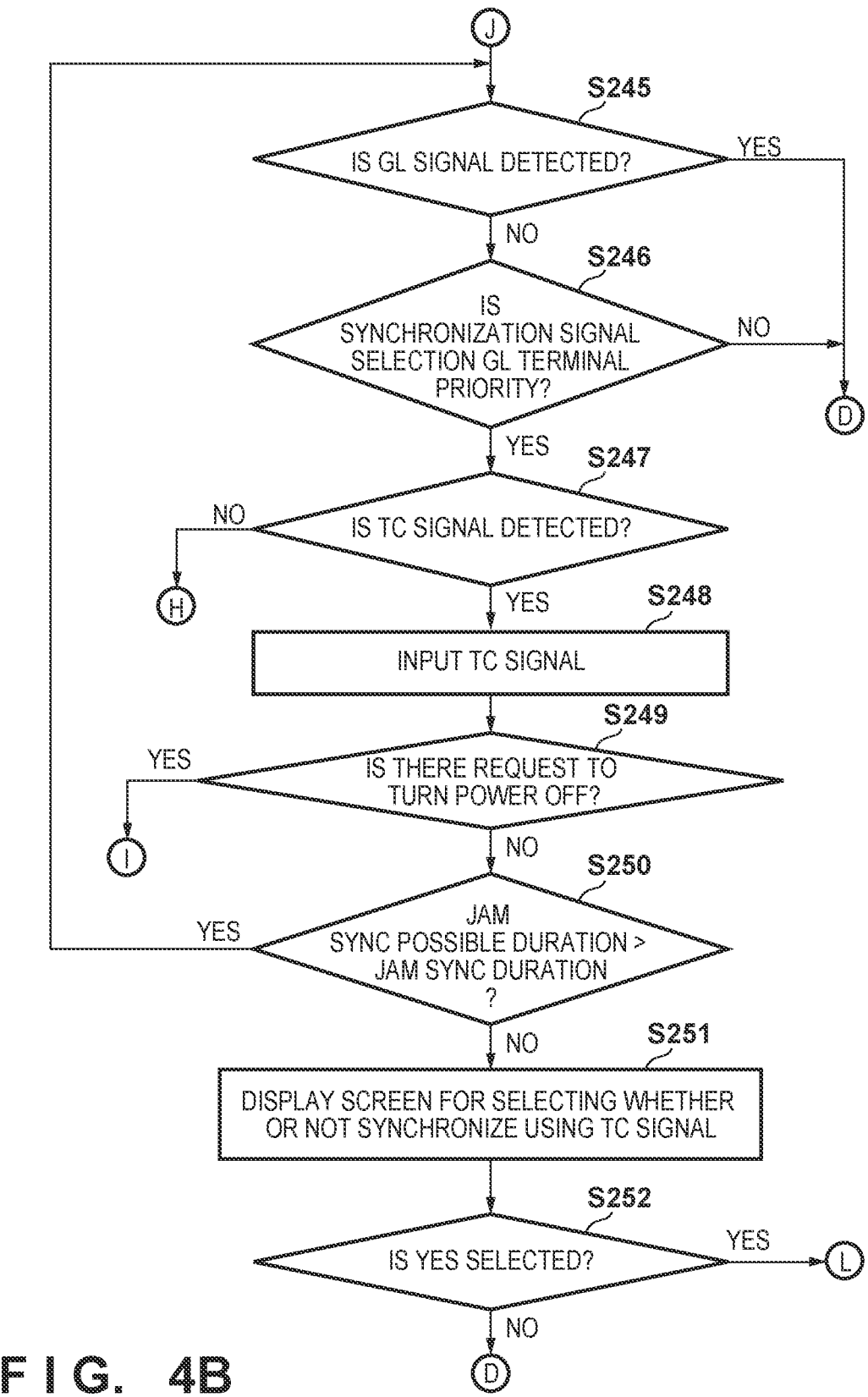

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating an image capturing apparatus 100 serving as a video camera applied in a first embodiment. The image capturing apparatus 100 includes terminals for inputting a GL signal and a TC signal from the exterior.

A CPU 101 carries out various types of control by executing control programs stored in ROM 102. This embodiment assumes that the ROM 102 is rewritable non-volatile memory. RAM 103 is used as a work area when the CPU 101 executed programs, for storing various types of data, and so on. The RAM 103 is also used to store video data. Aside from programs, the ROM 102 can hold display data and the like, such as menus.

The CPU 101 receives signals produced by user operations through an operation unit (constituted by various types of switches and buttons, as well as a touch panel) 106, and controls the various processing units. For example, the CPU 101 can start recording, stop recording, and so on by sending instructions to a recording processing unit 112. When a menu operation has been made, the CPU 101 can also send display data read out from the ROM 102 to a display processing unit 110 to display a menu.

A synchronization signal generating unit 105 generates a horizontal synchronization signal and a vertical synchronization signal of a video on the basis of a clock from a voltage-controlled crystal oscillator (VCXO) 104, and supplies those synchronization signals to various units. Images are captured and displayed (output) in synchronization with the horizontal synchronization signal and the vertical synchronization signal.

An image capturing unit 107 is configured including optical units such as a focus lens, a zoom lens, an aperture, a shutter, and so on, and carries out desired optical processing on an optical image entering from the exterior to form an image on an image capturing device 108. The image capturing device 108 carries out processing for converting the formed optical image into an electrical signal, and sends the electrical signal obtained from the conversion to a video signal processing unit 109. The image capturing device 108 is constituted by a CCD, a CMOS sensor, or the like.

The video signal processing unit 109 generates digital video data (captured image data) by carrying out image processing such as A/D conversion, amplification, and the like on the electrical signal obtained from the image capturing device 108. The video data is held in the RAM 103 as necessary, and can also be sent to the display processing unit 110, the recording processing unit 112, and the like as necessary without first being held in the RAM 103.

The display processing unit 110 composites the video data generated by the video signal processing unit 109, video data played back by the recording processing unit 112, the display data from the CPU 101, and so on, and outputs the result to a display panel 111 as a video signal. The display panel 111 displays the video signal from the display processing unit 110. The display panel 111 may be separate from the video camera, i.e., may be an external monitor, for example.

The recording processing unit 112 has functions for compressing (encoding) and decompressing (decoding) video signals. The recording processing unit 112 encodes the video data generated by the video signal processing unit 109 and records the encoded data into a recording medium 113 as a moving image file. MPEG2 (Moving Picture Experts Group), H.264, H.265, and so on can be given as examples of encoding formats. Upon receiving an instruction to play back a moving image file from the CPU 101, the recording processing unit 112 reads out the desired moving image file from the recording medium 113 and decodes that file to generate video data.

The recording medium 113 is a randomly-accessible recording medium such as a removable flash memory card, for example. The recording medium 113 can be attached to and removed from the video camera using a mounting/removal mechanism (not shown). The CPU 101 manages various types of data recorded into the recording medium 113 as files through a known file system such as the FAT file system or the like.

The CPU 101 also generates a timecode. Generally, the timecode is constituted by an hour, a minute, a second, a frame, a field bit, and a user bit. The CPU 101 holds the current timecode in the RAM 103, and assigns the timecode to video data upon the video data being generated by the video signal processing unit 109. The CPU 101 then advances the timecode that is held. The timecode assigned to the video data is displayed superimposed on the video data by the display processing unit 110, and is recorded in the moving image file, along with the video data, by the recording processing unit 112. If the timecode is changed through a menu operation or the like, the CPU 101 overwrites the timecode being held with the new timecode.

A GENLOCK signal detection unit 115 detects whether or not a GL signal is being input to a GENLOCK terminal 114 from the exterior. Here, the GL signal is, for example, a tri-level synchronization signal or a black and burst signal. The CPU 101 can acquire the input state of the GL signal by inquiring with the GENLOCK signal detection unit 115. When the GL signal is detected, the CPU 101 instructs a synchronization processing unit 120 to start a synchronization process using the GL signal.

A GENLOCK signal processing unit 116 extracts the horizontal synchronization signal and the vertical synchronization signal of the video from the GL signal and sends those synchronization signals to the synchronization processing unit 120.

Likewise, a timecode signal detection unit 118 detects whether or not a TC signal is being input to a timecode terminal 117 from the exterior. The CPU 101 can acquire the input state of the TC signal by inquiring with the timecode signal detection unit 118. When the TC signal is detected, the CPU 101 instructs the synchronization processing unit 120 to start a synchronization process using the TC signal.

A timecode signal processing unit 119 extracts the timecode from the TC signal and notifies the CPU 101 of the timecode. The timecode is updated with each frame, and the CPU 101 therefore obtains the timecode with each frame and verifies whether or not the timecode is correct. If the timecode is correct, the CPU 101 overwrites the timecode held in the RAM 103 with the verified timecode.

Furthermore, a timecode signal processing unit 119 extracts the horizontal synchronization signal and the vertical synchronization signal of the video from the TC signal and sends those synchronization signals to the synchronization processing unit 120.

Upon receiving an instruction to start the synchronization process from the CPU 101, the synchronization processing unit 120 carries out PLL control for the VCXO 104 so as to cancel out a phase difference between the horizontal synchronization signal from the synchronization signal generating unit 105 and the horizontal synchronization signal from the GENLOCK signal processing unit 116 or the timecode signal processing unit 119. When the phase difference between the horizontal synchronization signal generated by the synchronization signal generating unit 105 and the target horizontal synchronization signal falls within a predetermined range, the synchronization processing unit 120 notifies the CPU 101 that horizontal synchronization is complete.

Next, the CPU 101 inquires with the synchronization processing unit 120 as to the phase difference between the vertical synchronization signal from the synchronization signal generating unit 105 and the vertical synchronization signal from the GENLOCK signal processing unit 116 or the timecode signal processing unit 119. The CPU 101 notifies the synchronization signal generating unit 105 of the phase difference. In response, the synchronization signal generating unit 105 shifts the timing at which the vertical synchronization signal is output by an amount equivalent to that phase difference to bring the phase difference between the vertical synchronization signals within a predetermined range.

Note that if only one of the GL signal and the TC signal has been detected, one of those detected signals may be used as the target of the synchronization. However, if both of the signals have been detected, a method is conceivable in which the user is allowed to select which signal to use through menu settings or the like.

Figure 5A:
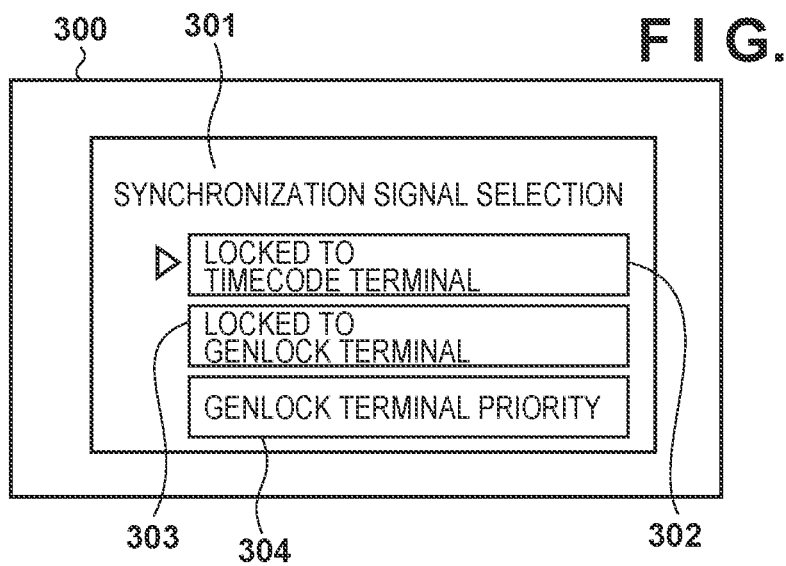
FIGS. 5A to 5F are diagrams illustrating examples of displays in a display unit of a first image capturing apparatus.

FIGS. 5A to 5F illustrate an example of a menu screen displayed in the display panel 111. In FIG. 5A, reference number 300 indicates the screen of the display panel, and a menu 301 contains three examples of selectable items with respect to the synchronization signal. When the user selects an item 302, indicated as "locked to timecode terminal", in this menu, the synchronization process will always use the TC signal, and GL signal detections will be ignored. When an item 303, indicated as "locked to GENLOCK terminal", is selected, the synchronization process will always use the GL signal, and the TC signal will be used only for acquiring the timecode itself. When an item 304, indicated as "GENLOCK terminal priority", is selected, the synchronization process will be carried out using the TC signal when only the TC signal is detected; however, if the GL signal has been detected, the synchronization process will be started using the GL signal even if the TC signal has been detected at the same time. Note that the synchronization setting is maintained as long as the user does not make any particular change thereto, and is therefore assumed to be stored in non-volatile memory (the ROM 102).

According to the foregoing configuration, the horizontal synchronization signal and vertical synchronization signal internal to the video camera can be synchronized with the GL signal or the TC signal. At this time, the CPU 101 may cause the display processing unit 110 to display an icon indicating that the synchronization process is underway, an icon indicating that the synchronization process is complete, or the like.

Figure 5B:
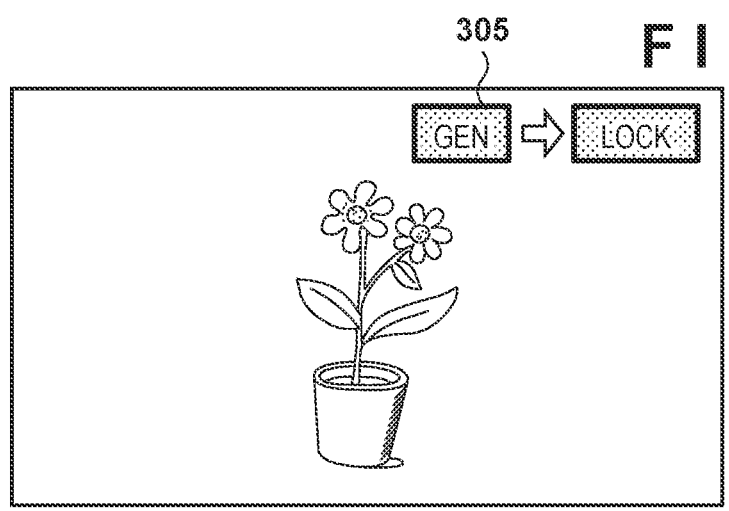
Figure 5C:
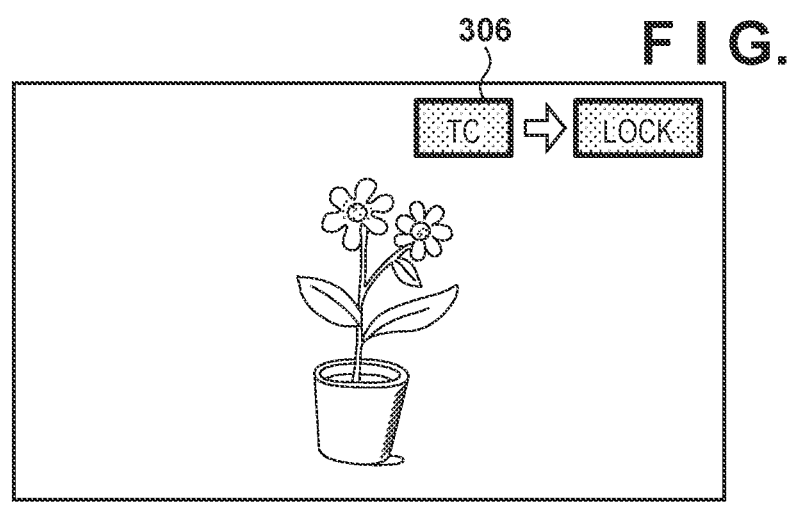
Figure 5D:
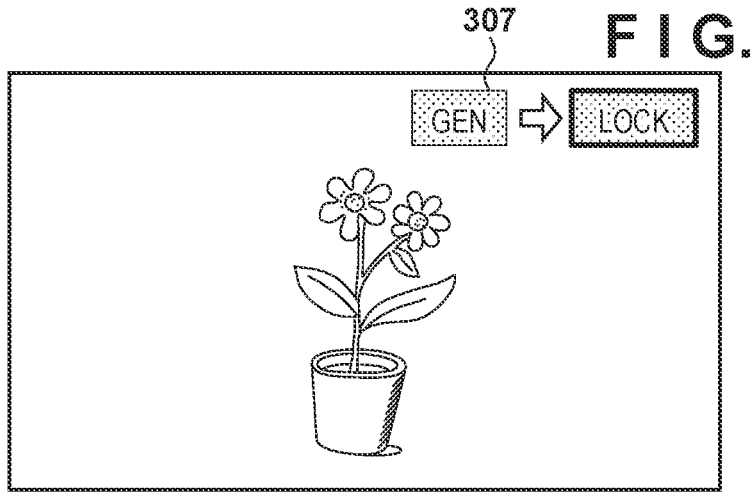
Figure 5E:
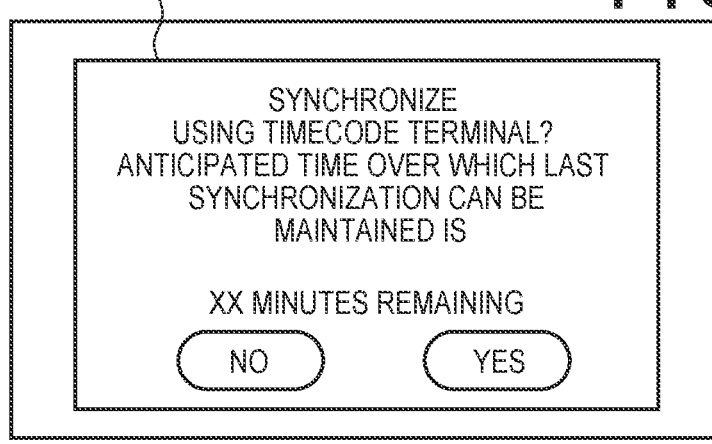
Figure 5F:
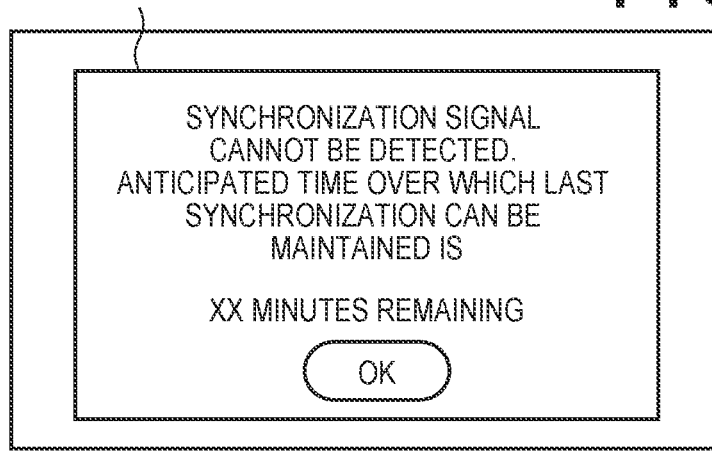

In FIG. 5B, an icon 305 indicates that synchronization is being carried out using the GL signal, whereas in FIG. 5C, an icon 306 indicates that the synchronization is being carried out using the TC signal. The user can therefore understand which synchronization signal is currently being used for synchronization, which makes it possible to prevent the synchronization process from being carried out using a signal other than the desired synchronization signal.

It is conceivable to express the state of the synchronization process by causing the icons 305 and 306 to flash, change size, change color, or the like. For example, it is conceivable to have the icons 305 and 306 flash to indicate a state where the synchronization process has started but the synchronization is not yet complete. Additionally, it is conceivable to change the color of the icon to red or the like in a situation where a signal has been detected but the synchronization signal does not match the resolution, framerate, or the like of the video from the image capturing apparatus and synchronization is therefore not possible.

If, in the synchronized state, the phase of the horizontal synchronization signal of the GL signal or the TC signal being input has changed, the continuing the PLL control for the VCXO 104 makes it possible to follow that phase change. On the other hand, if the phase of the vertical synchronization signal has changed, the CPU 101 is notified that the synchronization has been lost. The CPU 101 notifies the synchronization signal generating unit 105 of the phase difference and causes the output timing of the vertical synchronization signal to be adjusted.

The synchronization processing unit 120 has a Jam Sync mode. When a cable is removed from the GENLOCK terminal 114 or the timecode terminal 117, the GENLOCK signal detection unit 115 or the timecode signal detection unit 118 notifies the CPU 101 that the corresponding signal cannot be detected. The CPU 101 then instructs the synchronization processing unit 120 to enter Jam Sync mode. In Jam Sync mode, PLL control is carried out for the VCXO 104 so as to maintain the last synchronization state that was in effect before the cable was removed. Furthermore, even if the power is turned off and then on again, the Jam Sync state from before the power was turned off is maintained. For example, it is conceivable to use a method in which a clock (at a frequency less than or equal to the framerate) that continues to operate even when power to the camera is cut off, such as an RTC, is taken as a reference, with that clock and the horizontal/vertical synchronization signal phase difference being held, and the state is restored on the basis of that phase difference after the power has been turned on again.

However, in the Jam Sync mode, the signals may become out of synchronization as time passes. The length of time for which the synchronization can be maintained depends on conditions such as the capabilities, temperature, voltage, and so on of the VCXO, but for example, the output clock of the VCXO is assumed to have a maximum difference of +0.05 ppm relative to a target value. For video with a resolution of 1920×1080 and a framerate of 30 fps, if the video clock of the synchronization signal is exactly 74.25 MHz, the time until the synchronization is off by a single line is:

samples containing blanking interval/number of lines=2200 horizontal samples/1125 vertical lines time difference per single sample (sec)=1/74.25 MHz−1/(74.25 MHz×(1+0.05 ppm))

time difference per second (sec)=2200×1125×30× time difference per single sample time until synchronization is off by a single line (2200 samples) (sec)=2200/74.25 MHz±time difference per second≈592 seconds If the permissible amount of skew is determined, the time for which the Jam Sync mode is effective can be calculated through the foregoing equations, and the CPU 101 can instruct the display processing unit 110 to display the effective time.

Synchronization control carried out by the image capturing apparatus 100 according to the present embodiment when signal cables are connected to the GENLOCK terminal 114 and the timecode terminal 117 will be described next with reference to the flowcharts in FIGS. 2A-2C, 3, and 4A-4C. Programs pertaining to these flowcharts are assumed to be stored in the ROM 102 and executed by the CPU 101.

In step S200, the CPU 101 determines whether the image capturing apparatus 100 is currently recording video. If the CPU 101 determines that video is being recorded, the synchronization process is not to be carried out, and the process therefore returns to step S200. However, if the CPU 101 determines that video is not being recorded, the process moves to step S201.

In step S201, the CPU 101 determines the current setting for the signal used as the synchronization signal. If the CPU 101 determines that "GENLOCK terminal priority" is selected, the process moves to step S202. However, if the CPU 101 determines that "locked to timecode terminal" is selected, the process moves to step S219, and if the CPU 101 determines that "locked to GENLOCK terminal" is selected, the process moves to step S220. This determination is made in accordance with which of "locked to timecode terminal" 302, "locked to GENLOCK terminal" 303, and "GENLOCK terminal priority" 304 has been selected by the user in the synchronization signal selection menu 301 illustrated in FIG. 5A, as described above.

In step S202, the CPU 101 determines whether the GL signal is being input from the exterior on the basis of a signal from the GENLOCK signal detection unit 115. If the CPU 101 determines that the GL signal is being input, the process moves to step S203, whereas if the CPU 101 determines that the GL signal is not being input, the process moves to step S209.

In step S203, the CPU 101 controls the synchronization processing unit 120 to extract the horizontal synchronization signal and the vertical synchronization signal from the GL signal being input from the exterior and start the synchronization process using those signals. The CPU 101 then moves the process to step S204.

In step S204, the CPU 101 once again determines whether the GL signal is being input from the exterior. If the CPU 101 determines that the GL signal is being input, the process moves to step S205, whereas if the CPU 101 determines that the GL signal is not being input, the process moves to step S229 (FIG. 4A) to exit the synchronization process using the GL signal. Here, if the synchronization is not complete (if the phase difference is not within a predetermined value), it is also conceivable to carry out control for stopping the synchronization process and then returning to step S200, instead of moving to step S229.

In step S205, the CPU 101 calculates a phase difference between the horizontal and vertical synchronization signals extracted from the GL signal and the synchronization signal generated within the image capturing apparatus 100, and compares that phase difference with a pre-set threshold. If the CPU 101 determines that the phase difference is within the threshold, the process moves to step S206, whereas if the CPU 101 determines that the phase difference is not within the threshold, the process returns to step S204. Here, the descriptions will refer again to FIGS. 5A to 5F. If the phase difference is within the threshold, the synchronization is considered to be complete. As such, the CPU 101 displays the icon 305, illustrated in FIG. 5B, to indicate that synchronization using the GL signal is complete. When such is not the case, the CPU 101 displays the icon 305 in a flashing manner. It is sufficient for the states to be distinguishable from each other, and thus colors may be changed, e.g., between blue and red, instead of lighting/flashing the display.

In step S206, the CPU 101 determines whether the synchronization signal selection menu setting in the image capturing apparatus 100 has been changed to "locked to timecode terminal". If the CPU 101 determines that the setting has been changed, the process moves to step S229 (FIG. 4A) to exit the synchronization process using the GL signal, whereas if the CPU 101 determines that the setting has not been changed, the process moves to step S207.

In step S207, the CPU 101 determines whether or not the TC signal is being input to the image capturing apparatus 100. If the CPU 101 determines that the TC signal is being input, the process moves to step S208, whereas if the CPU 101 determines that the TC signal is not being input, the process returns to step S204.

In step S208, the CPU 101 obtains the timecode from the TC signal input from the exterior, and overwrites the timecode currently held within the image capturing apparatus 100. After this, the CPU 101 returns the process to step S204.

In step S209, the CPU 101 determines whether the TC signal is being input from the exterior of the apparatus on the basis of a signal from the timecode signal detection unit 118. If the CPU 101 determines that the TC signal is being input, the process moves to step S210, whereas if the CPU 101 determines that the TC signal is not being input, the process returns to step S200.

In step S210, the CPU 101 controls the synchronization processing unit 120 to extract the horizontal synchronization signal and the vertical synchronization signal from the TC signal being input from the exterior and start the synchronization process using those signals. The CPU 101 then moves the process to step S211.

In step S211, the CPU 101 determines whether or not the GL signal is being input from the exterior. If the CPU 101 determines that the GL signal is being input, the process moves to step S217, whereas if the CPU 101 determines that the GL signal is not being input, the process moves to step S212.

In step S212, the CPU 101 calculates a phase difference between the horizontal and vertical synchronization signals extracted from the input TC signal and the synchronization signal generated within the image capturing apparatus 100, and compares the calculated phase difference with a pre-set predetermined value (a threshold). If the CPU 101 determines that the phase difference is within the predetermined value, the process moves to step S213, whereas if the CPU 101 determines that the phase difference is not within the predetermined value, the process returns to step S211. Here, the descriptions will refer again to FIGS. 5A to 5F. The phase difference being within the predetermined value indicates that the synchronization is complete. As such, the CPU 101 displays the icon 306, illustrated in FIG. 5C, to indicate that synchronization using the TC signal is complete. When such is not the case, the CPU 101 displays the icon 306 in the flashing manner to indicate that the synchronization is not yet complete.

In step S213, the CPU 101 determines whether the synchronization signal selection menu setting in the image capturing apparatus 100 has been changed to "locked to timecode terminal". If the CPU 101 determines that the setting has been changed to "locked to timecode terminal", the process moves to step S226 (FIG. 3), whereas if the CPU 101 determines that the setting has not been changed, the process moves to step S214.

In step S214, the CPU 101 determines whether the synchronization signal selection menu setting in the image capturing apparatus 100 has been changed to "locked to GENLOCK terminal". If the CPU 101 determines that the setting has been changed to "locked to GENLOCK terminal", the process moves to step S229 (FIG. 4A) to exit the synchronization process using the TC signal, whereas if the CPU 101 determines that the setting has not been changed, the process moves to step S215.

In step S215, the CPU 101 determines whether or not the TC signal is being input to the timecode terminal on the basis of a signal from the timecode signal detection unit 118. If the CPU 101 determines that the TC signal is being input, the process moves to step S216, whereas if the CPU 101 determines that the TC signal is not being input, the process moves to step S229 (FIG. 4A) to exit the synchronization process using the TC signal.

In step S216, the CPU 101 obtains the timecode from the TC signal input from the exterior, and overwrites the timecode currently held within the image capturing apparatus 100. After this, the CPU 101 returns the process to step S211.

In step S217, the CPU 101 determines whether or not the image capturing apparatus 100 is currently recording. If the CPU 101 determines that the image capturing apparatus 100 is currently recording, the process moves to step S212 without carrying out the synchronization process using the GL signal. However, if the CPU 101 determines that the image capturing apparatus 100 is not currently recording, the process moves to step S218 in order to carry out the synchronization process using the GL signal.

In step S218, the CPU 101 stops the synchronization process using the TC signal. The CPU 101 then starts the synchronization process using the GL signal by advancing the process to step S203.

In step S219, the CPU 101 determines whether the TC signal is being input from the exterior on the basis of a signal from the timecode signal detection unit 118. If the CPU 101 determines that the TC signal is being input from the exterior, the process moves to step S224, whereas if the CPU 101 determines that the TC signal is not being input, the process returns to step S200.

In step S220, the CPU 101 determines whether the GL signal is being input from the exterior on the basis of a signal from the GENLOCK signal detection unit 115. If the CPU 101 determines that the GL signal is being input from the exterior, the process moves to step S203, where the synchronization process using the GL signal is started. However, if the CPU 101 determines that the GL signal is not being input, the process moves to step S221.

In step S221, the CPU 101 determines whether the synchronization signal selection menu setting in the image capturing apparatus 100 has been changed to "locked to timecode terminal". If the CPU 101 determines that the setting has been changed to "locked to timecode terminal", the process returns to step S200, whereas if the CPU 101 determines that the setting has not been changed to "locked to timecode terminal", the process moves to step S222.

In step S222, the CPU 101 determines whether the TC signal is being input from the exterior on the basis of a signal from the timecode signal detection unit 118. If the CPU 101 determines that the TC signal is being input, the process moves to step S223, whereas if the CPU 101 determines that the TC signal is not being input, the process returns to step S200.

In step S223, the CPU 101 obtains the timecode from the TC signal input from the exterior, and overwrites the timecode currently held within the image capturing apparatus 100. The CPU 101 then returns the process to step S220.

In step S224 (FIG. 3), the CPU 101 controls the synchronization processing unit 120 to extract the horizontal synchronization signal and the vertical synchronization signal from the TC signal input from the exterior and start the synchronization process using those signals. The CPU 101 then moves the process to step S225.

In step S225, the CPU 101 finds a phase difference between the horizontal and vertical synchronization signals extracted from the input TC signal and the synchronization signal generated within the image capturing apparatus 100, and compares that phase difference with a pre-set predetermined value (a threshold). If the CPU 101 determines that the phase difference is within the predetermined value, the process moves to step S226, whereas if the CPU 101 determines that the phase difference is not within the predetermined value, the process returns to step S225. Here, the descriptions will refer again to FIGS. 5A to 5F. If the phase difference is within the predetermined value, the CPU 101 displays the icon 306, illustrated in FIG. 5C, to indicate that synchronization using the TC signal is complete. However, if the phase difference exceeds the predetermined value, the CPU 101 displays the icon 306 in a flashing manner.

In step S226, the CPU 101 determines whether the synchronization signal selection menu setting has been changed to a setting other than "locked to timecode terminal". If the CPU 101 determines that the setting has been changed to a setting other than "locked to timecode terminal", the process moves to step S229 (FIG. 4A) to exit the synchronization process using the TC signal, whereas if the CPU 101 determines that the setting has not been changed, the process moves to step S227.

In step S227, the CPU 101 determines whether the TC signal is being input from the exterior on the basis of a signal from the timecode signal detection unit 118. If the CPU 101 determines that the TC signal is being input, the process moves to step S228, whereas if the CPU 101 determines that the TC signal is not being input, the process moves to step S229 to exit this synchronization process.

In step S228, the CPU 101 obtains the timecode from the TC signal input from the exterior, and overwrites the timecode currently held within the image capturing apparatus 100. After this, the CPU 101 returns the process to step S225.

In step S229 (FIG. 4A), the CPU 101 starts the Jam Sync mode. Here, the descriptions will refer again to FIGS. 5A to 5F. Reference number 307 in FIG. 5D indicates an example of the display of a translucent icon indicating that Jam Sync is in effect, and using this display makes it possible to notify the user that Jam Sync is in effect.

In step S230, the CPU 101 determines whether the GL signal is being input from the exterior. If the CPU 101 determines that the GL signal is being input, the process returns to step S200 to exit the Jam Sync mode, whereas if the CPU 101 determines that the GL signal is not being input, the process moves to step S231.

In step S231, the CPU 101 refers to the setting for the signal used as the synchronization signal. If the CPU 101 determines that "GENLOCK priority" is selected as the synchronization signal selection, the process moves to step S232, whereas if the CPU 101 determines that "GENLOCK priority" is not selected, the process returns to step S200.

In step S232, the CPU 101 determines whether or not a request to turn the power of the image capturing apparatus 100 off has been made, on the basis of the signal from the operation unit 106 or the like. If the CPU 101 determines that a request to turn the power off has been made, the process moves to step S253, whereas if such a request has not been made, the process moves to step S233.

In step S233, the CPU 101 compares a Jam Sync possible duration with a time spanning from when the synchronization process using the MCA, signal has stopped due to the GL signal not being detected to the current time (that is, a Jam Sync duration) (here, the "Jam Sync duration" is specifically the amount of time that has passed from when the process of step S229 has started to the current time). If the CPU 101 determines that the Jam Sync possible duration is longer than the Jam Sync duration, the process moves to step S234, whereas if the CPU 101 determines that the Jam Sync possible duration is not longer than the Jam Sync duration, the process returns to step S200. Here, the descriptions will refer again to FIGS. 5A to 5F. Reference number 309 in FIG. 5F indicates an example of a status screen in the Jam Sync mode. By notifying the user of the Jam Sync possible duration in this manner, the user can determine whether or not the synchronization can be maintained until his or her work is complete.

In step S234, the CPU 101 determines whether the image capturing apparatus 100 is currently recording. If the CPU 101 determines that the image capturing apparatus 100 is currently recording, the process returns to step S230, whereas if the CPU 101 determines that the image capturing apparatus 100 is not currently recording, the process moves to step S235.

In step 236, the CPU 101 determines whether the TC signal is being input from the exterior on the basis of a signal from the timecode signal detection unit 118. If the CPU 101 determines that the TC signal is being input, the process moves to step S235, whereas if the CPU 101 determines that the TC signal is not being input, the process returns to step S230.

In step S236, the CPU 101 displays a selection menu for selecting whether or not to carry out the synchronization process using the TC signal in the display panel 111, and then moves the process to step S237. Here, the descriptions will refer again to FIGS. 5A to 5F. Reference number 308 in FIG. 5E indicates an example of this selection menu. At this time, the CPU 101 may notify the user of the Jam Sync possible duration as well.

In step S237, the CPU 101 determines the result of the selection made by the user through the selection menu. If the user has selected the option of carrying out the synchronization process using the TC signal, the CPU 101 moves the process to step S238, whereas if the user has not selected that option, the process moves to step S245.

In step S238, the CPU 101 controls the synchronization processing unit 120 to extract the horizontal synchronization signal and the vertical synchronization signal from the TC signal being input from the exterior and start the synchronization process using those signals. The CPU 101 then moves the process to step S239.

In step S239, the CPU 101 determines whether the GL signal is being input from the exterior on the basis of a signal from the GENLOCK signal detection unit 115. If the CPU 101 determines that the GL signal is being input, the process returns to step S229 to exit the synchronization process using the TC signal, whereas if the CPU 101 determines that the GL signal is not being input, the process moves to step S240.

In step S240, the CPU 101 calculates a phase difference between the horizontal and vertical synchronization signals extracted from the input TC signal and the synchronization signal generated within the image capturing apparatus 100, and compares that phase difference with a pre-set predetermined value. If the CPU 101 determines that the phase difference is within the predetermined value, the process moves to step S241, whereas if not, the process returns to step S239.

In step S241, the CPU 101 determines whether the synchronization signal selection menu setting has been changed to "locked to timecode terminal". If the CPU 101 determines that the setting has been changed to "locked to timecode terminal", the process moves to step S226, whereas if the CPU 101 determines that the setting has not been changed, the process moves to step S242.

In step S242, the CPU 101 determines whether the synchronization signal selection menu setting in the image capturing apparatus 100 has been changed to "locked to GENLOCK terminal". If the CPU 101 determines that the setting has been changed to "locked to GENLOCK terminal", the process returns to step S229 to exit the synchronization process using the TC signal, whereas if the CPU 101 determines that the setting has not been changed, the process moves to step S243.

In step S243, the CPU 101 determines whether the TC signal is being input from the exterior on the basis of a signal from the timecode signal detection unit 118. If the CPU 101 determines that the TC signal is being input, the process moves to step S244, whereas if the CPU 101 determines that the TC signal is not being input, the process returns to step S229 to exit the synchronization process using the TC signal.

In step S244, the CPU 101 obtains the timecode from the TC signal input from the exterior, and overwrites the timecode currently held within the image capturing apparatus 100. After this, the CPU 101 returns the process to step S239.

In step S245, the CPU 101 determines whether the GL signal is being input from the exterior on the basis of a signal from the GENLOCK signal detection unit 115. If the CPU 101 determines that the GL signal is being input from the exterior, the process returns to step S200, whereas if the GL signal is not being input, the process moves to step S246.

In step S246, the CPU 101 determines whether the synchronization signal selection menu setting has been changed to "GENLOCK terminal priority". If the setting has been changed, the process moves to step S247, whereas if the setting has not been changed, the process returns to step S200.

In step S247, the CPU 101 determines whether or not the TC signal is being input from the exterior on the basis of a signal from the timecode signal detection unit 118. If the CPU 101 determines that the TC signal is being input, the process moves to step S248, whereas if the CPU 101 determines that the TC signal is not being input, the process moves to step S230.

In step S248, the CPU 101 obtains the timecode from the TC signal input from the exterior, and overwrites the timecode currently held within the image capturing apparatus 100. The CPU 101 then moves the process to step S249.

In step S249, the CPU 101 determines whether or not a request to turn the power of the image capturing apparatus 100 off has been made by the user through the operation unit 106. If the CPU 101 determines that a request to turn the power off has been made, the process moves to step S253, whereas if the CPU 101 determines that such a request has not been made, the process moves to step S250.

In step S250, the CPU 101 compares the amount of time that has passed following the start of the Jam Sync mode (the Jam Sync duration) with the Jam Sync possible duration. If the CPU 101 determines that the Jam Sync duration is shorter than the Jam Sync possible duration, the process moves to step S245. On the other hand, if the CPU 101 determines that the Jam Sync duration is equal to or longer than the Jam Sync possible duration, the process moves to step S251.

In step S251, the CPU 101 displays a selection menu for selecting whether or not to carry out the synchronization process using the TC signal in the display panel 111, and then moves the process to step S252. Reference number 308 in FIG. 5E indicates an example of the selection menu displayed at this time. At this time, the user is notified of the Jam Sync possible duration as well.

In step S252, the CPU 101 determines whether or not the user has selected the option of carrying out the synchronization process using the TC signal. If the CPU 101 determines that the option of carrying out the synchronization process using the TC signal has been selected, the process moves to step S238, whereas if the CPU 101 determines that that option has not been selected, the process returns to step S200.

In step S253, the CPU 101 records the Jam Sync duration and the Jam Sync possible duration in the ROM 102. The CPU 101 then moves the process to step S254.

In step S254, the CPU 101 turns the power of the image capturing apparatus 100 off on the basis of the power off request. At this time, the CPU 101 obtains the time at which the power is turned off from a timer (not shown), and stores that time in the ROM 102. The CPU 101 then moves the process to step S255.

In step S255, the CPU 101 turns the power of the image capturing apparatus 100 on the basis of a power on request. The CPU 101 then moves the process to step S256.

In step S256, the CPU 101 reads out the time at which the power was turned off, recorded in the ROM 102, and calculates the time that has passed since the power was turned off from the difference between the read-out time and the time currently indicated by the timer. The time that has passed is then added to the Jam Sync duration to update the Jam Sync duration. The CPU 101 then moves the process to step S257.

In step S257, the CPU 101 compares the Jam Sync duration with the Jam Sync possible duration. If the CPU 101 determines that the Jam Sync duration is shorter than the Jam Sync possible duration, the process returns to step S229, but if not, i.e., if the Jam Sync duration to which the time passed since the power was turned off has been added is longer than the Jam Sync possible duration, the process returns to step S200.

According to the present embodiment as described thus far, when, during the GENLOCK terminal priority mode, a cable is connected to the timecode terminal 117 to carry out a timecode synchronization process, and a cable is then connected to the GENLOCK terminal 114 to synchronize a video signal accurately, the synchronization process of the video signal can be carried out first using the TC signal, and then transition to the synchronization process of the video signal using the GL signal. The burden of having the user explicitly open a synchronization signal selection menu to change settings can be omitted at this time. Furthermore, if the GL signal is disconnected after the video signal synchronization is complete, the cameras will operate in Jam Sync, which is a synchronized state. According to the present embodiment, the synchronization process can be prevented from being carried out using the TC signal if the TC signal is connected in this state, which makes it possible to prevent a drop in accuracy.

Although the foregoing embodiment describes the TC signal and the GL signal as examples of signals including the synchronization signal, the configuration is not limited thereto. A TC signal obtained over a network line may be used, and packet communication information used for phase matching may be employed.

Additionally, although the foregoing embodiment describes using an icon as identification information for identifying whether the synchronization is carried out using the TC signal, the GL signal, or the Jam Sync, the synchronization may be identified using different colors, sizes, or the like, and the state (e.g., whether processing for achieving synchronization is currently underway, or if the state is already a synchronized state) may be expressed using different colors, sizes, or the like.

Second Embodiment

The aforementioned first embodiment described the configuration of and processing by the image capturing apparatus 100 with reference to FIG. 1. As another embodiment, a second embodiment will describe a configuration that is equivalent to that of the image capturing apparatus 100, but which uses an expansion unit or the like to expand functions.

Figure 6:
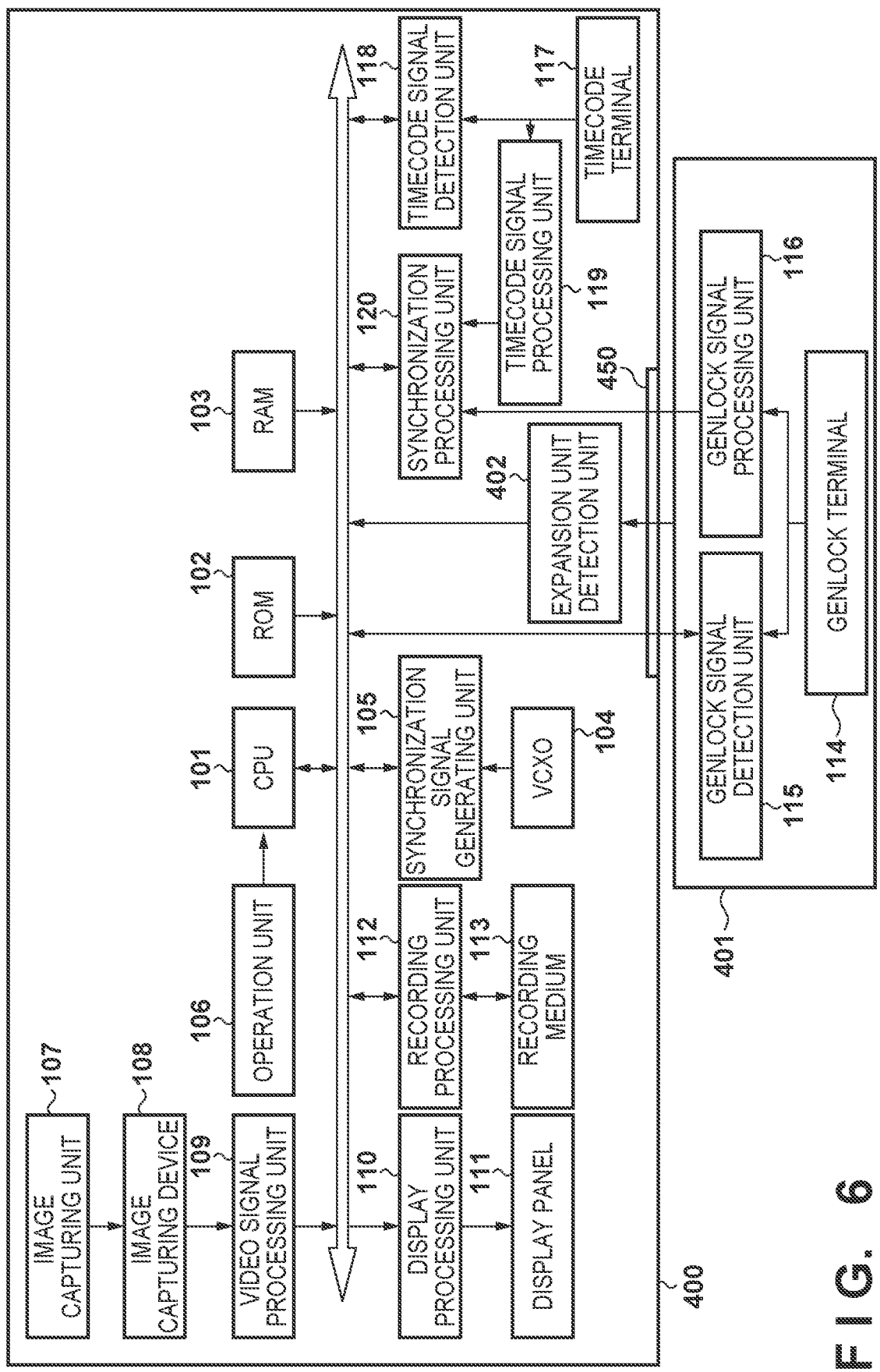
FIG. 6 is a block diagram illustrating an image capturing apparatus according to a second embodiment.
Figure 7A:
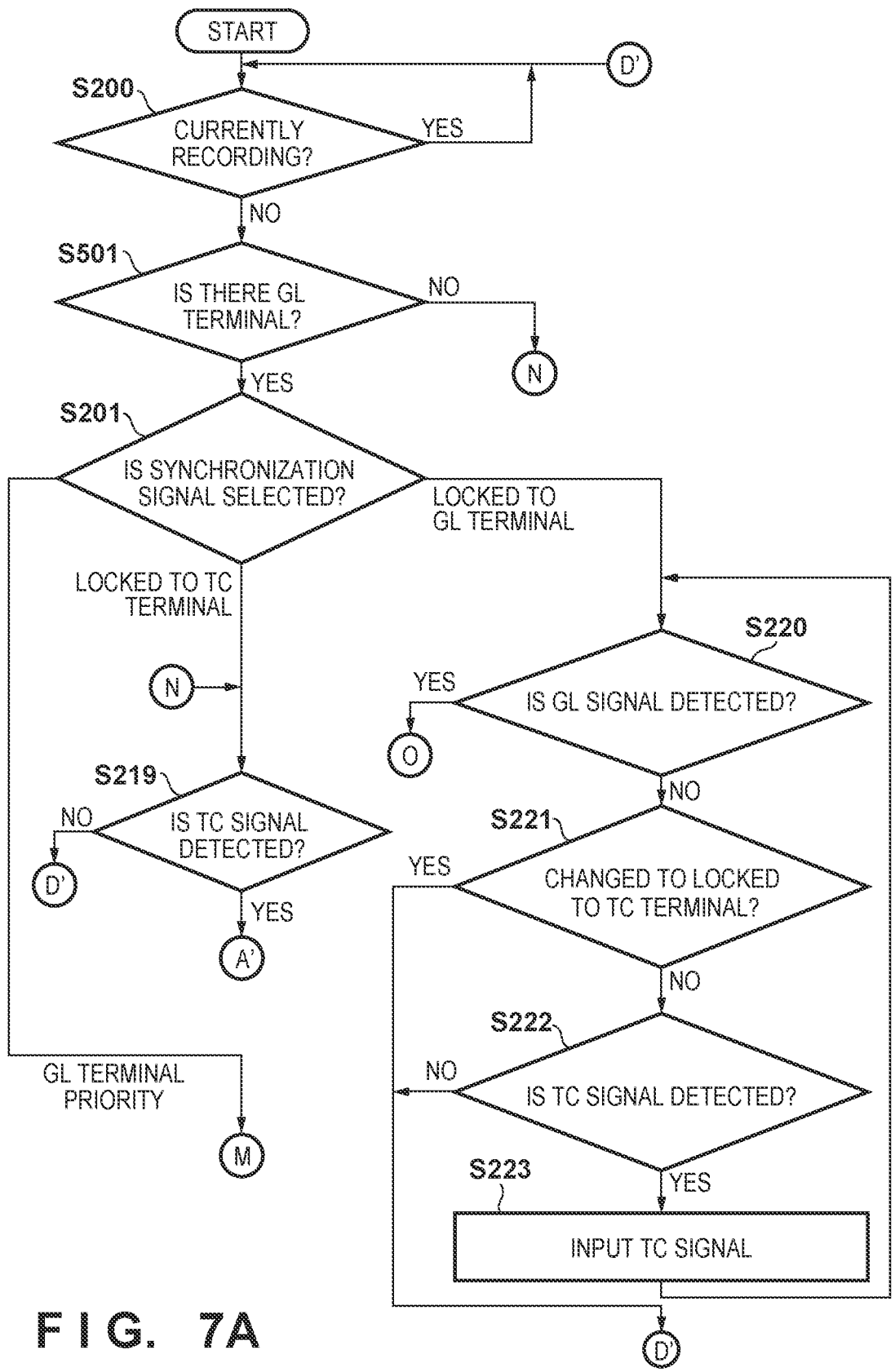
FIGS. 7A to 7C are flowcharts illustrating a control sequence executed by the image capturing apparatus according to the second embodiment.
Figure 7B:
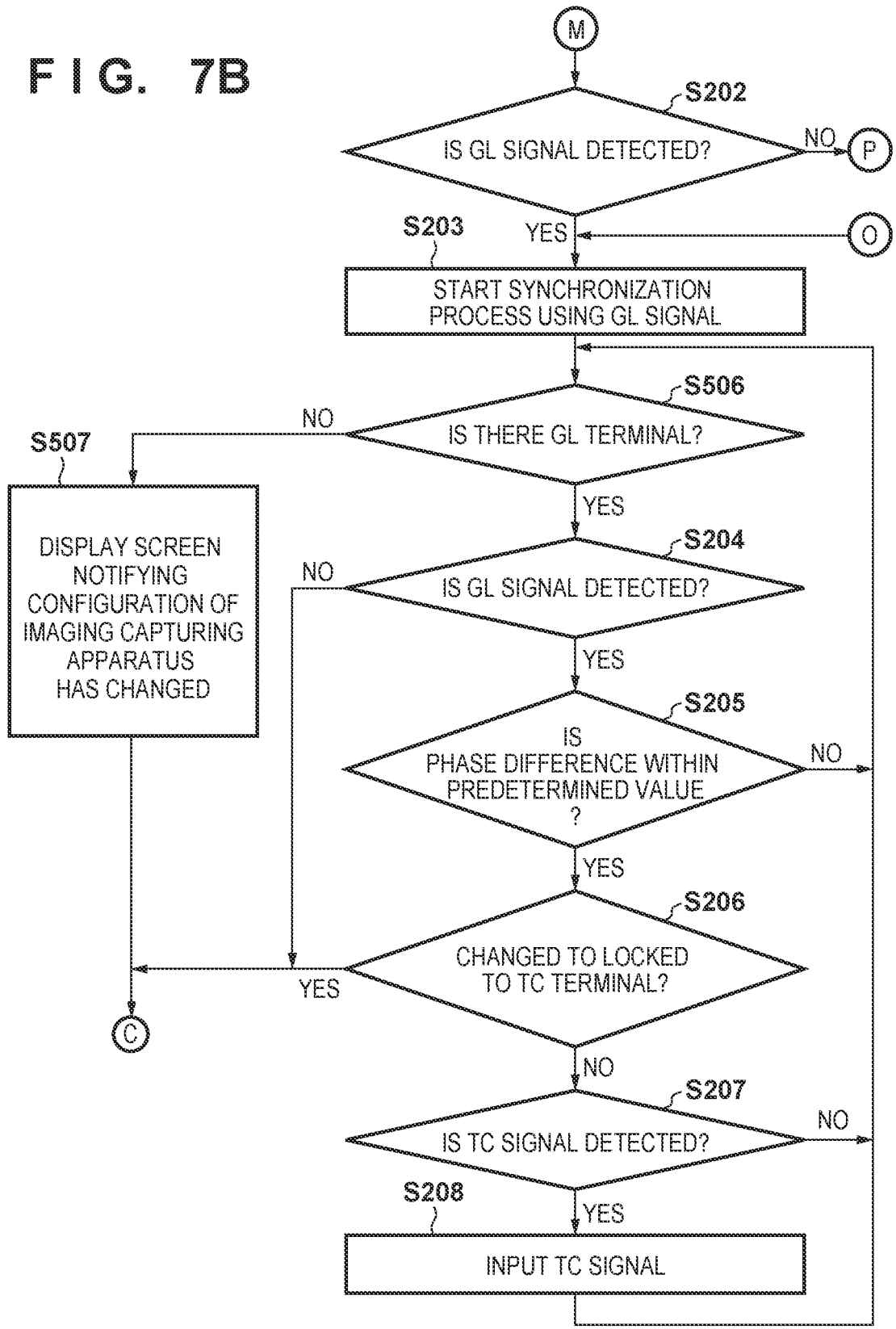
Figure 7C:
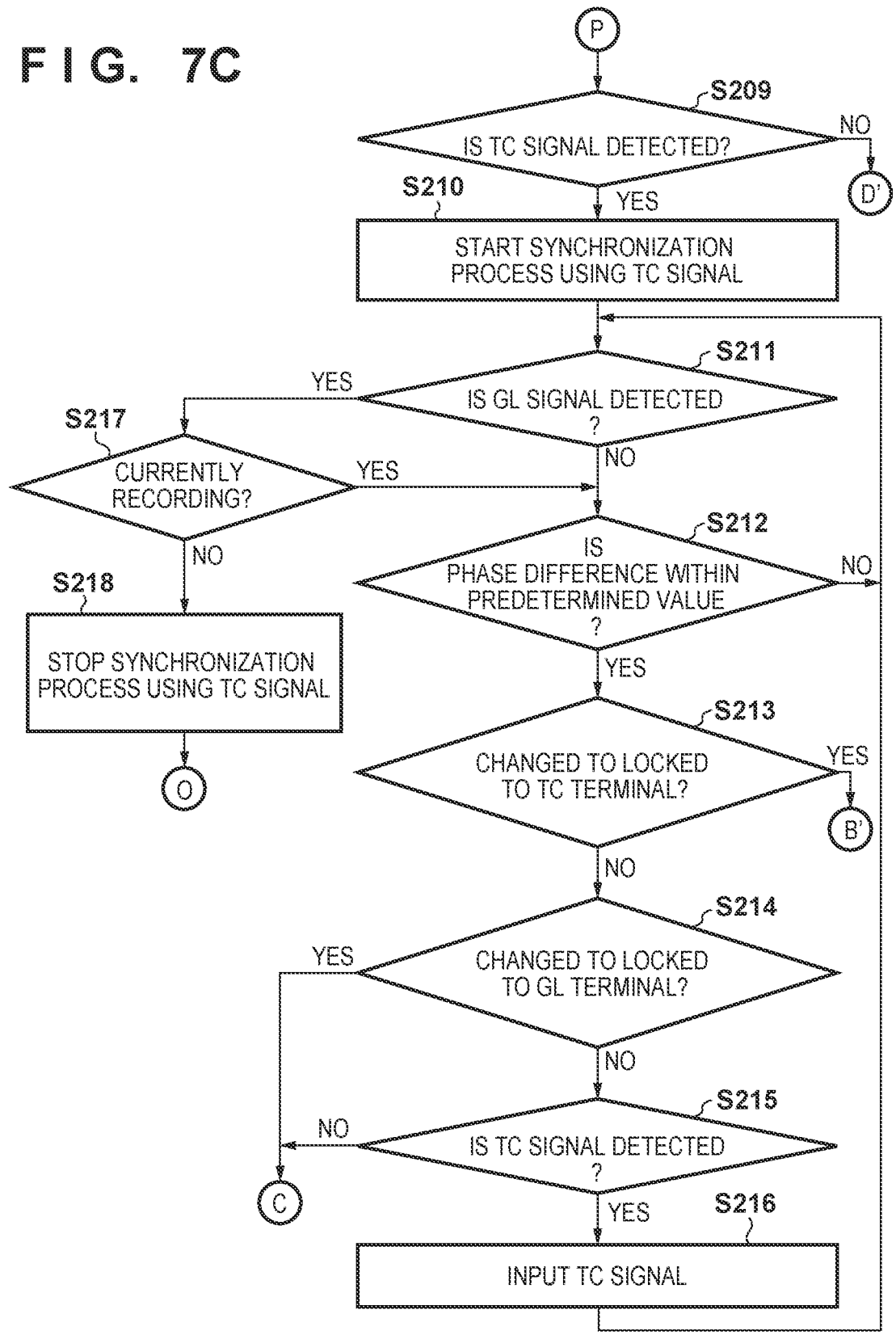
Figure 8:
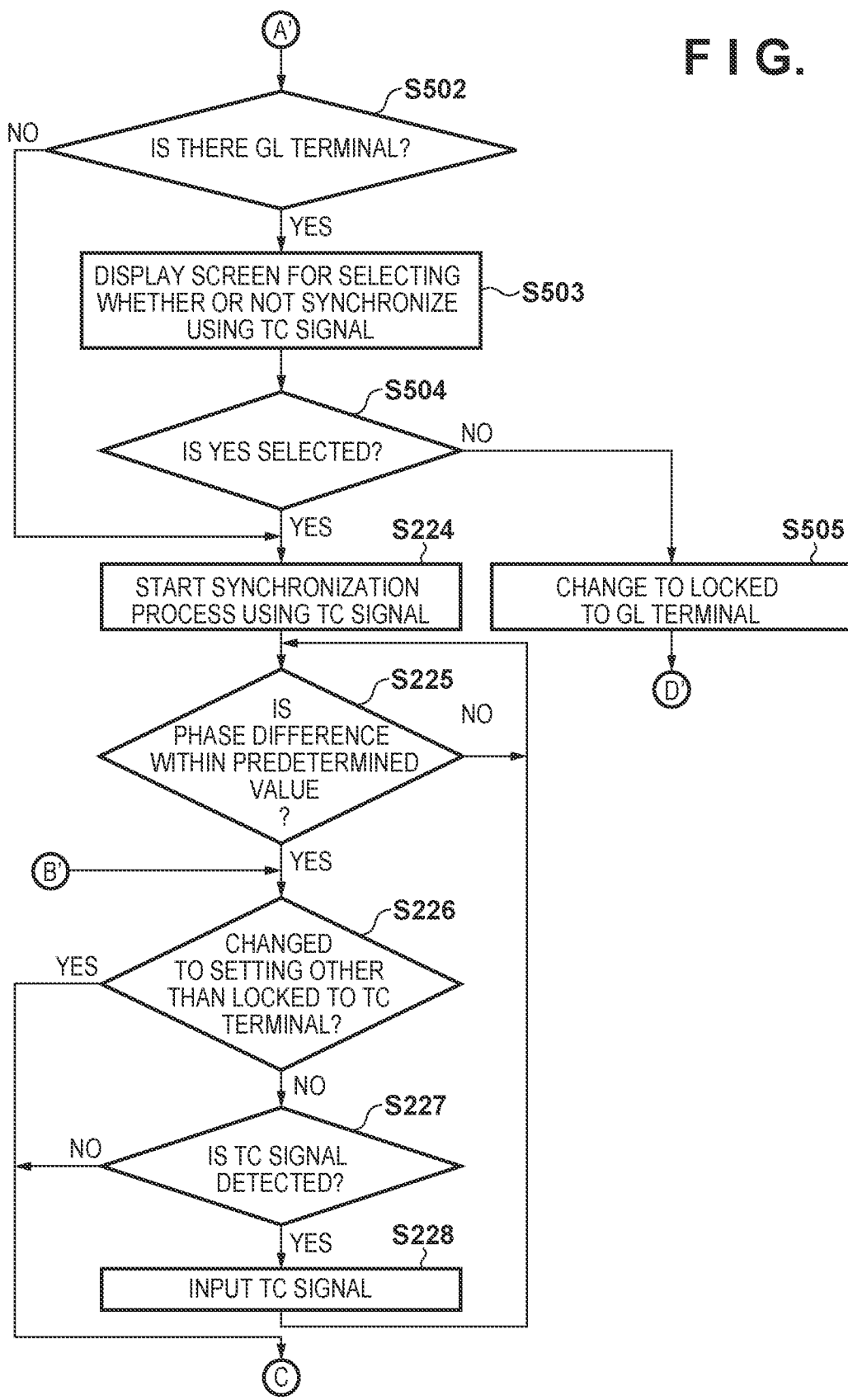
FIG. 8 is a flowchart illustrating a control sequence executed by the image capturing apparatus according to the second embodiment.

An image capturing apparatus according to the present second embodiment includes an interface for connecting various types of expansion units. FIG. 6 is a block diagram illustrating an image capturing apparatus 400, and an expansion unit 401 connected via an interface 450, according to the present second embodiment. Synchronization processing carried out using this configuration will be described hereinafter with reference to the configuration of the image capturing apparatus 400 and the expansion unit 401 connected thereto. Configurations that are the same as in FIG. 1 will be given the same reference signs, and will not be described.

As illustrated in FIG. 6, the image capturing apparatus 400 according to the present second embodiment does not have the GENLOCK terminal 114 illustrated in FIG. 1. As such, the video synchronization process using the GL signal can be carried out by connecting (or mounting) the expansion unit 401, which is constituted by the GENLOCK terminal 114, the GENLOCK signal detection unit 115, and the GENLOCK signal processing unit 116, to the image capturing apparatus 400. A cover on an expansion slot provided in the image capturing apparatus 400 is opened, and the expansion unit 401 is inserted into that slot.

An expansion unit detection unit 402 detects whether or not an expansion unit is connected to the interface 450 (detects a change from a disconnected state to a connected state or a change from a connected state to a disconnected state), and sends a signal indicating the result of the detection to the CPU 101. The interface 450 is a generic interface, and thus a plurality of types of expansion units can be attached thereto. The expansion unit detection unit 402 obtains an ID value for identifying the expansion unit 401 from the connected expansion unit 401 via the interface 450, and communicates that ID value to the CPU 101. The CPU 101 can determine the type of the connected expansion unit by verifying the obtained ID value against an ID table (not shown) indicating expansion units that can be connected, the table being stored in the ROM 102 in advance. In other words, the CPU 101 can determine whether or not a connected unit is an expansion unit including the GENLOCK terminal 114, and can therefore distinguish from situations where an expansion unit that does not include the GENLOCK terminal 114 has been connected.

A synchronization control process carried out by the image capturing apparatus 400 to which the expansion unit 401 has been connected, when signal cables are connected to the GENLOCK terminal 114 and the timecode terminal 117, will be described next with reference to the flowcharts in FIGS. 7A-7C and 8. Note that parts that are the same as in the synchronization process illustrated in FIGS. 2A-2C, 3, and 4A-4C will be given the same reference signs, and will not be described. It should also be noted that the "C" branch in the processing illustrated in FIGS. 7B, 7C and 8 corresponds to step S229 in FIG. 4A.

In step S501, the CPU 101 determines whether or not the expansion unit 401 including the GENLOCK terminal 114 is connected to the image capturing apparatus 400, using the information communicated from the expansion unit detection unit 402. If the CPU 101 determines that the expansion unit 401 is connected, the process moves to step S201, whereas if the CPU 101 determines that the expansion unit 401 is not connected, the process moves to step S219. Thus if the expansion unit does not include the GENLOCK terminal 114, control is performed so that the synchronization process using the TC signal is always carried out, regardless of the synchronization signal selection setting.

If the process has moved to step S201, the CPU 101 carries out the same processing as in the foregoing first embodiment. For example, if in step S202 the CPU 101 determines that the GL signal is being input on the basis of a signal from the GENLOCK signal detection unit 115, the process moves to step S203, where the synchronization process using the GL signal is started. The CPU 101 then moves the process to step S506.

In step S506, the CPU 101 determines whether or not the expansion unit 401 including the GENLOCK terminal 114 is connected to the image capturing apparatus 400, using the information communicated from the expansion unit detection unit 402. If the CPU 101 determines that the expansion unit 401 including the GENLOCK terminal 114 is connected, the process moves to step S204, whereas if the CPU 101 determines that the expansion unit 401 including the GENLOCK terminal 114 is not connected, the process moves to step S507.

Figure 9A:
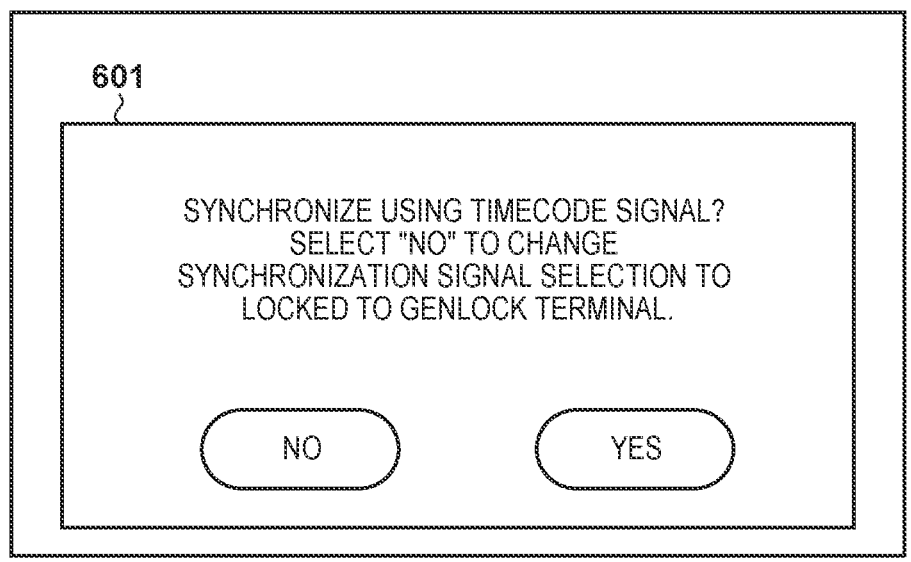
FIGS. 9A and 9B are diagrams illustrating examples of displays in a display unit of a second image capturing apparatus.
Figure 9B:
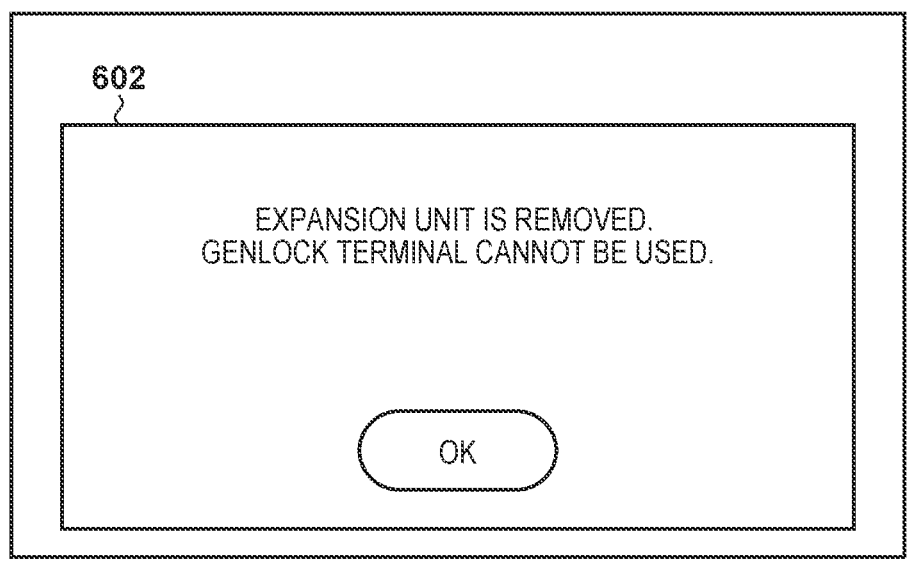

In step S507, the CPU 101 notifies the user that the expansion unit 401 has been removed and the configuration of the image capturing apparatus 400 has changed (that the synchronization process using the GL signal cannot be carried out). In FIG. 9B, reference number 602 indicates an example of a confirmation screen for notifying the user that the configuration has changed.

If the process has moved to step S219, the CPU 101 determines whether or not the TC signal is being input on the basis of a signal from the timecode signal detection unit. If the CPU 101 determines that the TC signal is being input, the process moves to step S502, whereas if the CPU 101 determines that the TC signal is not being input, the process returns to step S200.

In step S502 (FIG. 8), the CPU 101 determines whether or not the expansion unit 401 including the GENLOCK terminal 114 is connected to the image capturing apparatus 400, using the information communicated from the expansion unit detection unit 402. If the CPU 101 determines that the expansion unit 401 including the GENLOCK terminal 114 is connected, the process moves to step S503, whereas if the CPU 101 determines that the expansion unit 401 including the GENLOCK terminal 114 is not connected, the process moves to step S224.

In step S503, the CPU 101 displays, in the display panel 111, a selection menu for allowing the user to select whether or not to synchronize using the TC signal. This is for notifying the user that synchronization using the TC signal will be started in a situation where the synchronization signal selection is set to "locked to timecode terminal" despite the GENLOCK terminal 114 being present. Reference number 601 in FIG. 9A indicates an example of this selection screen. Then, in step S504, the CPU 101 determines whether or not an option for starting synchronization using the TC signal has been selected (whether or not the user has selected "yes" in the selection menu). If the CPU 101 determines that the option for starting synchronization using the TC signal has been selected, the process moves to step S224, where synchronization using the TC signal is started. On the other hand, if the CPU 101 determines that the option for starting synchronization using the TC signal has not been selected, the process moves to step S505, where the synchronization signal selection setting is changed to "locked to GENLOCK terminal". The CPU 101 then returns the process to step S200, and advances to the synchronization process using the GL signal as a result of the determination in step S201, as described earlier. Although the descriptions mention changing the synchronization signal setting to "locked to GENLOCK terminal", it is conceivable to store the original setting value and then restore the setting to the stored setting value once the expansion unit 401 has been removed.

The processing that follows thereafter is the same as that in the flowcharts of FIGS. 2A-2C, 3, and 4A-4C, described in the first embodiment.

According to the present second embodiment as described thus far, when "locked to GENLOCK terminal" is set despite an expansion unit not being connected, a situation where the synchronization process using the TC signal remains unexecuted can be prevented. Furthermore, a situation where the synchronization process using the TC signal is executed despite the expansion unit being connected and the GL signal being input to the GENLOCK terminal 114 can be prevented. The burden of having the user explicitly open a synchronization signal selection menu to change settings can be omitted at this time.

Although the foregoing has described preferred embodiments of the present invention, the present invention is not intended to be limited to the specific embodiments, and all variations that do not depart from the essential spirit of the invention are intended to be included in the scope of the present invention. Some of the above-described embodiments may be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-98809, filed May 27, 2019, which is hereby incorporated by reference herein in its entirety.

What is claimed is:

1. An image capturing apparatus having an input terminal for synchronization with another image capturing apparatus, the apparatus comprising:
    a generating unit that generates a video signal by shooting an image using an image capturing unit;
    a first detecting unit that detects an input of a first synchronization signal, where the first synchronization signal is a GENLOCK signal;
    a second detecting unit that detects an input of a second synchronization signal, where the second synchronization signal is a timecode signal;
    a first synchronization unit that carries out a first synchronization process for matching phases of the video signals and the first synchronization signal in order to synchronize the video signal with the first synchronization signal;
    a second synchronization unit that carries out a second synchronization process for matching phases of the video signal and the second synchronization signal in order to synchronize the video signal with the second synchronization signal;
    a timecode assigning unit that assigns, to the video signal, a timecode based on the second synchronization signal; and
    a control unit that carries out control so that when the first synchronization signal has been detected by the first detecting unit while the second synchronization process is being executed, the second synchronization process is stopped and the first synchronization process is executed, wherein, even if the second synchronization process based on the second synchronization signal is stopped, the control unit updates the timecode assigned by the timecode assigning unit while the second synchronization signal is inputted.

2. The apparatus according to claim 1,
wherein the first synchronization signal is a signal with which synchronization can be executed at a higher accuracy than with the second synchronization signal.

3. The apparatus according to claim 1,
wherein the GENLOCK signal is a tri-level synchronization signal or a black and burst signal.

4. The apparatus according to claim 1,
wherein the control unit carries out control so that, when the input of the first synchronization signal has been detected by the first detecting unit during the second synchronization process, the first synchronization process is not carried out while a video is being recorded.

5. The apparatus according to claim 4,
wherein the control unit carries out control so that, when the input of the first synchronization signal has been detected by the first detecting unit during the second synchronization process, the first synchronization process is not carried out while a video is being recorded, and the first synchronization process is started in response to the recording of the video ending.

6. The apparatus according to claim 1, further comprising:
a display control unit that causes information indicating whether a synchronization process is being carried out using the first synchronization signal, or a synchronization process is being carried out using the second synchronization signal, to be displayed in a display unit.

7. The apparatus according to claim 1, further comprising:
a setting unit that sets, in response to a selection made by a user, one of the first synchronization signal and the second synchronization signal to be used preferentially in the synchronization process.

8. The apparatus according to claim 7,
wherein the control unit carries out control so that:
when the first synchronization signal has been set to be used preferentially by the setting unit, the second synchronization process is stopped and the first synchronization process is executed when the first synchronization signal has been detected by the first detecting unit while the second synchronization process is being executed; and
when the first synchronization signal has not been set to be used preferentially by the setting unit, the second synchronization process is continued even if the first synchronization signal has been detected by the first detecting unit while the second synchronization process is being executed.

9. The apparatus according to claim 7,
wherein the setting unit sets one of a setting that uses the first synchronization signal preferentially, a setting that uses the first synchronization signal, and a setting that uses the second synchronization signal, in response to a selection made by the user.

10. An image capturing apparatus having an input terminal for synchronization with another image capturing apparatus, the apparatus comprising:
a generating unit that generates a video signal by shooting an image using an image capturing unit;
an interface for connecting an expansion unit, the expansion unit including a first input terminal, and a first detecting unit that detects an input of a first synchronization signal to the first input terminal; and
a detecting unit that detects whether the expansion unit is connected to the interface or is not connected to the interface;
a second input terminal;
a second detecting unit that detects an input of a second synchronization signal to the second input terminal;
a synchronization unit that carries out a first synchronization process for synchronizing the video signal on the basis of the first synchronization signal or a second synchronization process for synchronizing the video signal on the basis of the second synchronization signal; and
a control unit that carries out control so that when the first synchronization signal has been detected by the first detecting unit while the second synchronization process is being executed, the second synchronization process is stopped and the first synchronization process is executed,
wherein when the detecting unit has detected that the expansion unit is not connected, the control unit locks the synchronization to synchronization using the second synchronization unit.

11. The apparatus according to claim 10,
wherein the control unit includes a unit that, when the detecting unit has detected that the expansion unit is connected in a state where a setting is made so that only the second synchronization unit is used, displays a menu for selecting whether or not to change from the second synchronization unit to the first synchronization unit and accepts a selection from a user.

12. The apparatus according to claim 10,
wherein the control unit includes a notification unit that notifies the user that the first synchronization signal cannot be used when the detecting unit has detected that the expansion unit is not connected.

13. The apparatus according to claim 1,
wherein the control unit carries out control to:
transition to Jam Sync for maintaining the last synchronization state when the input of the first synchronization signal has stopped in a state where the first synchronization unit is carrying out a process for synchronizing;
maintain the Jam Sync until a predetermined amount of time has passed after the transition to the Jam Sync when the second synchronization signal has been detected by the second detecting unit during the Jam Sync; and
transition to synchronization by the second synchronization unit using the second synchronization signal after the predetermined amount of time has passed.

14. The apparatus according to claim 13,
wherein the control unit includes a notification unit notifies the user that the Jam Sync is in effect during the Jam Sync.

15. The apparatus according to claim 13,
wherein when the second detecting unit has detected the second synchronization signal during the Jam Sync, the control unit displays a selection screen for the user to instruct whether or not to transition to the synchronization process by the second synchronization unit.

16. The apparatus according to claim 15,
wherein the control unit displays the selection screen until the predetermined amount of time has passed after the transition to the Jam Sync.

17. The apparatus according to claim 13, wherein the control unit includes a display unit that displays a remaining amount of time the Jam Sync can be maintained.

18. The apparatus according to claim 13, wherein when power to the apparatus has been turned from on to off and then on again during the Jam Sync, the control unit adds a time for which the power was off to the time for which the Jam Sync is in effect.

19. A method of controlling an image capturing apparatus having an input terminal for synchronization with another image capturing apparatus, the method comprising:
 (a) generating a video signal by shooting an image using an image capturing unit;
 (b) detecting an input of a first synchronization signal, where the first synchronization signal is a GENLOCK signal;
 (c) detecting an input of a second synchronization signal, where the second synchronization signal is a timecode signal,
 (d) carrying out a first synchronization process for matching phases of the video signal and the first synchronization signal in order to synchronize the video signal with the first synchronization signal;
 (e) carrying out a second synchronization process for matching phases of the video signal and the second synchronization signal in order to synchronize the video signal with the second synchronization signal;
 f) assigning, to the video signal, a timecode based on the second synchronization signal; and
 g) carrying out control so that when the first synchronization signal has been detected in the detecting (h) while the second synchronization process is being executed, the second synchronization process is stopped and the first synchronization process is executed,
 wherein, even if the second synchronization process based on the second synchronization signal is stopped, the control unit updates the timecode assigned in the assigning (f) while the second synchronization signal is inputted.

20. A non-transitory computer-readable: storage medium storing a program which, when read and executed by a computer of an image capturing apparatus having an input terminal for synchronization with another image capturing apparatus, causes the image capturing apparatus to executes the steps of a method of controlling the image capturing apparatus, the method comprising:
 (a) generating a video signal by shooting an image using an image capturing unit;
 (b) detecting an input of a first synchronization signal, where the first synchronization signal is a GENLOCK signal;
 (c) detecting an input of a second synchronization signal, where the second synchronization signal is a timecode signal;
 (d) carrying out a first synchronization process for matching phases of the video signal and the first synchronization signal in order to synchronize the video signal with the first synchronization signal;
 (e) carrying out a second synchronization process for matching phases of the video signal and the second synchronization signal in order to synchronize the video signal with the second synchronization signal;
 (f) assigning, to the video signal, a timecode based on the second synchronization signal; and
 (g) carrying out control so that when the first synchronization signal has been detected in the detecting (b) while the second synchronization process is being executed, the second synchronization process is stopped and the first synchronization process is executed,
 wherein, even if the second synchronization process based on the second synchronization signal is stopped, the control unit updates the timecode assigned in the assigning (f) while the second synchronization signal is inputted.

21. The apparatus according to claim 1, wherein the first synchronization unit adjusts the phase of the video signal so that phase difference between the video signal and the first synchronization signal falls within a predetermined range in the first synchronization process, and
 wherein the second synchronization unit adjusts the phase of the video signal so that phase difference between the video signal and the second synchronization signal falls within a predetermined range in the second synchronization process.

22. The apparatus according to claim 1, wherein the first synchronization unit matches phases of horizontal synchronization signals of the video signal and the first synchronization signal and matches phases of vertical synchronization signals of the video signal and the first synchronization signal in the first synchronization process, and
 wherein the second synchronization unit matches phases of horizontal synchronization signals of the video signal and the second synchronization signal and matches phases of vertical synchronization signals of the video signal and the second synchronization signal in the second synchronization process.

* * * * *